(12) United States Patent
Singh et al.

(10) Patent No.: US 9,222,854 B2
(45) Date of Patent: Dec. 29, 2015

(54) VEHICLE DYNAMIC LOAD ESTIMATION SYSTEM AND METHOD

(71) Applicant: The Goodyear Tire & Rubber Company, Akron, OH (US)

(72) Inventors: Kanwar Bharat Singh, Stow, OH (US); Anthony William Parsons, Domeldange (LU); Marc Engel, Bissen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 176 days.

(21) Appl. No.: 13/795,629

(22) Filed: Mar. 12, 2013

(65) Prior Publication Data

US 2014/0278040 A1    Sep. 18, 2014

(51) Int. Cl.
*G01M 17/06* (2006.01)
*G01G 19/08* (2006.01)
*B60T 8/1755* (2006.01)
*B60W 40/13* (2012.01)
*B60W 50/00* (2006.01)

(52) U.S. Cl.
CPC ............ *G01M 17/06* (2013.01); *B60T 8/17551* (2013.01); *G01G 19/086* (2013.01); *B60T 2240/06* (2013.01); *B60T 2270/86* (2013.01); *B60W 2040/1307* (2013.01); *B60W 2040/1315* (2013.01); *B60W 2050/0052* (2013.01); *B60W 2520/105* (2013.01); *B60W 2520/125* (2013.01); *B60W 2520/18* (2013.01); *B60W 2530/10* (2013.01); *B60W 2530/20* (2013.01)

(58) Field of Classification Search
None
See application file for complete search history.

(56) References Cited

U.S. PATENT DOCUMENTS

| | | | | |
|---|---|---|---|---|
| 6,637,276 | B2 * | 10/2003 | Adderton et al. | 73/862.41 |
| 6,697,726 | B2 * | 2/2004 | Takagi et al. | 701/70 |
| 6,962,075 | B2 | 11/2005 | Bertrand | 73/146 |
| 7,130,735 | B2 * | 10/2006 | Brown et al. | 701/70 |
| 7,404,317 | B2 | 7/2008 | Mancosu et al. | 73/146 |
| 7,546,764 | B2 | 6/2009 | Morinaga et al. | 73/146 |
| 7,552,628 | B2 | 6/2009 | Mancosu et al. | 73/146 |
| 2002/0059023 | A1 * | 5/2002 | Takagi et al. | 701/70 |
| 2003/0236603 | A1 * | 12/2003 | Lu | 701/37 |
| 2004/0199314 | A1 * | 10/2004 | Meyers et al. | 701/38 |
| 2004/0254707 | A1 * | 12/2004 | Lu et al. | 701/70 |
| 2005/0033486 | A1 * | 2/2005 | Schmitt et al. | 701/1 |

(Continued)

FOREIGN PATENT DOCUMENTS

| | | | |
|---|---|---|---|
| DE | 102008046269 | 12/2009 | G01L 5/00 |
| WO | 2011/054363 | 5/2011 | B60G 17/0165 |

OTHER PUBLICATIONS

European Search Report received by Applicants Aug. 27, 2014.

*Primary Examiner* — Mussa A Shaawat
(74) *Attorney, Agent, or Firm* — Richard B. O'Planick

(57) ABSTRACT

A dynamic load estimation system and method is provided, the system including a tire supporting a vehicle; a vehicle-mounted acceleration sensor for determining a vehicle lateral acceleration and a vehicle longitudinal acceleration; a roll angle calculating model for determining a vehicle roll angle; a roll rate calculating model for determining a vehicle roll rate; a static normal load calculation model for calculating a measured static normal load; and a dynamic tire load estimation model for calculating an estimated dynamic load on the tire from the measured static normal load, the vehicle roll angle, the vehicle roll rate, the vehicle lateral acceleration and the vehicle longitudinal acceleration.

16 Claims, 24 Drawing Sheets

(56) References Cited

U.S. PATENT DOCUMENTS

| | | | |
|---|---|---|---|
| 2005/0177296 A1* | 8/2005 | Brown et al. | 701/70 |
| 2007/0010928 A1 | 1/2007 | Brusarosco et al. | 701/70 |
| 2007/0017727 A1* | 1/2007 | Messih et al. | 180/282 |
| 2008/0103659 A1 | 5/2008 | Mancosu et al. | 701/41 |
| 2009/0055040 A1 | 2/2009 | Nagaya | 701/29 |
| 2010/0063671 A1* | 3/2010 | Fink et al. | 701/33 |
| 2011/0199201 A1 | 8/2011 | Brusarosco et al. | 340/438 |
| 2013/0151075 A1* | 6/2013 | Moshchuk et al. | 701/38 |

* cited by examiner

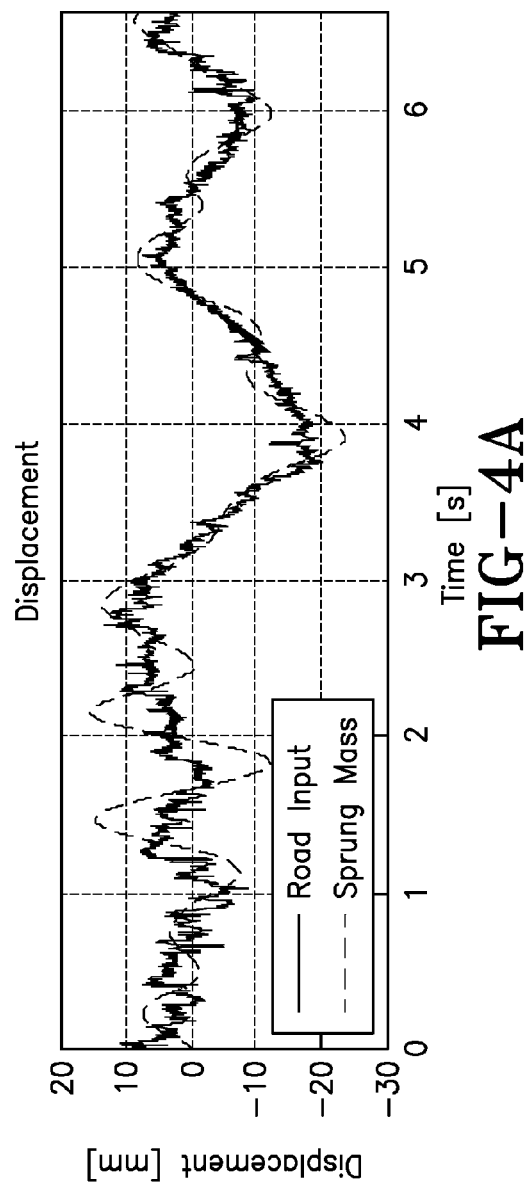
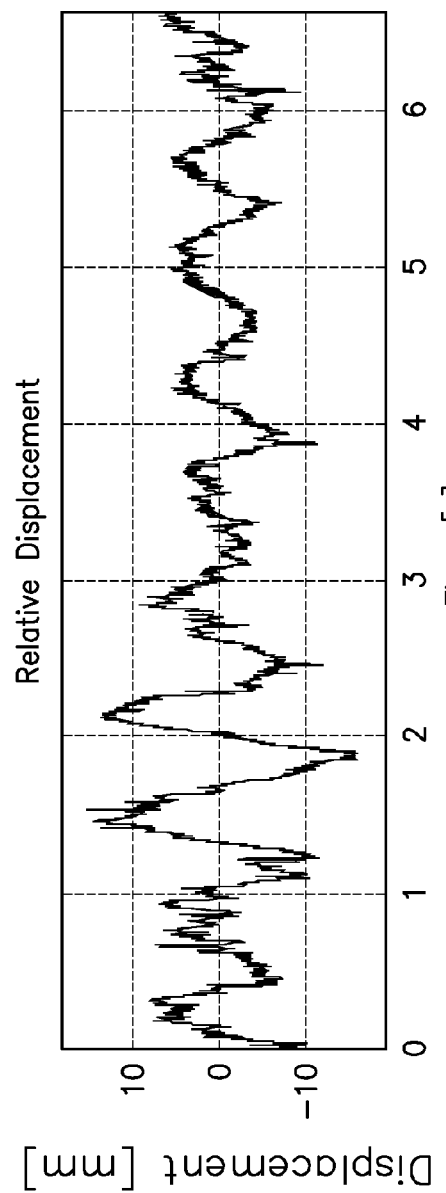
FIG-4A
FIG-4B

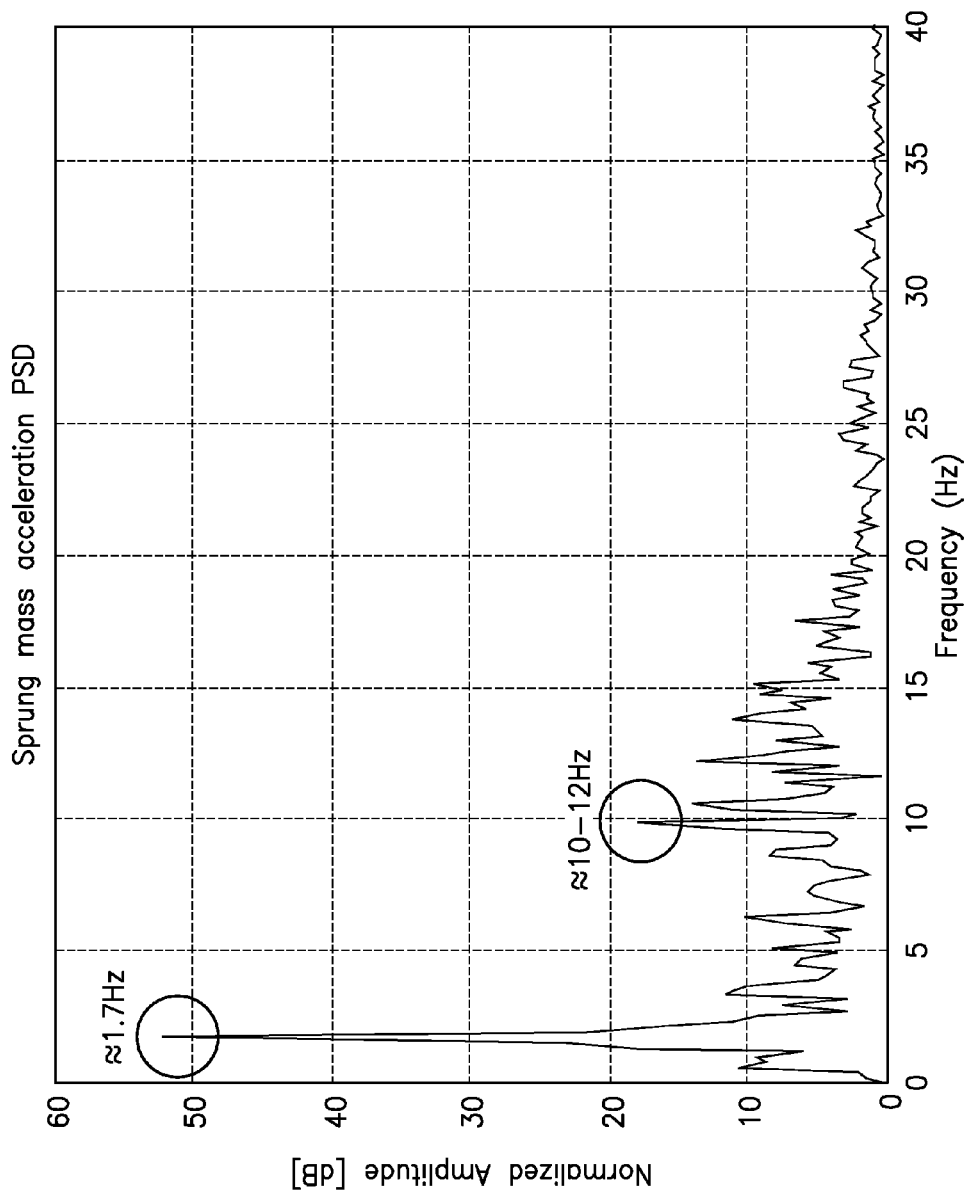

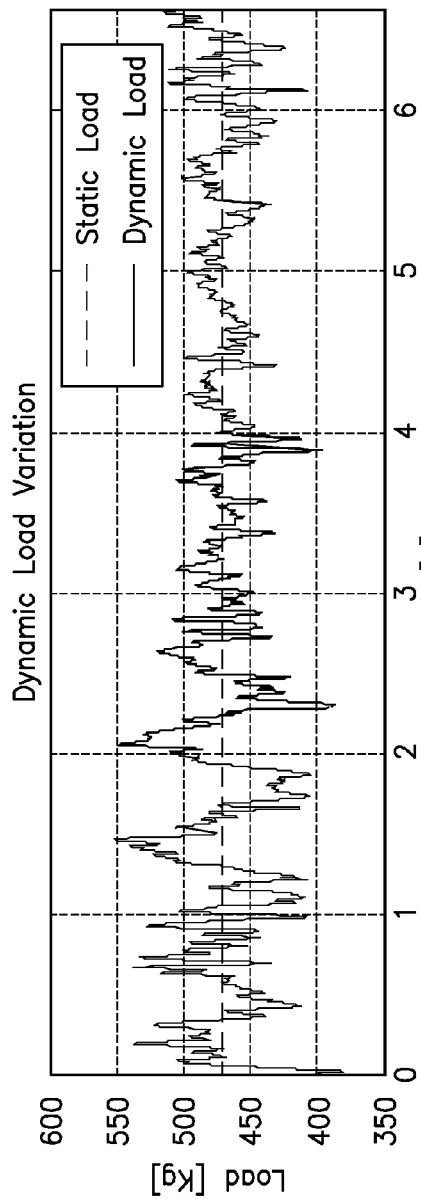
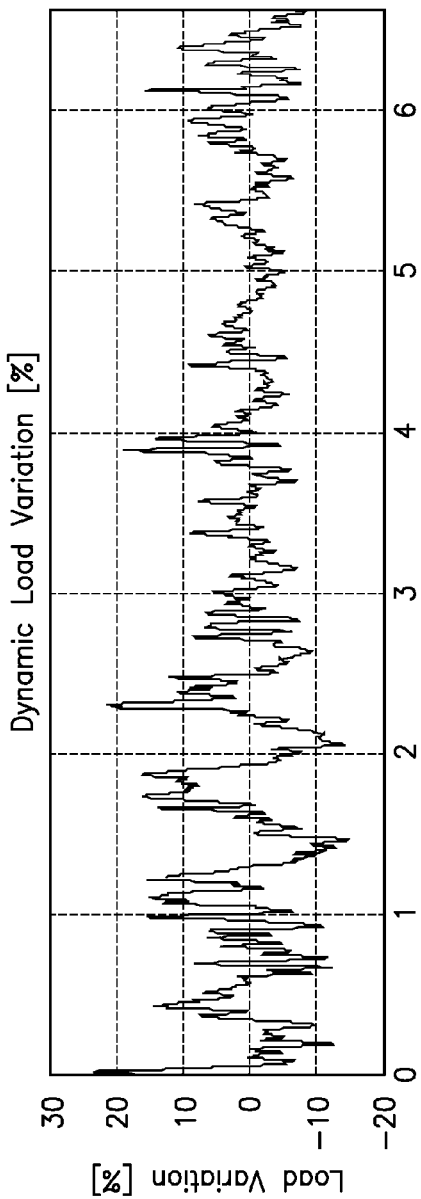
FIG-5A
FIG-5B

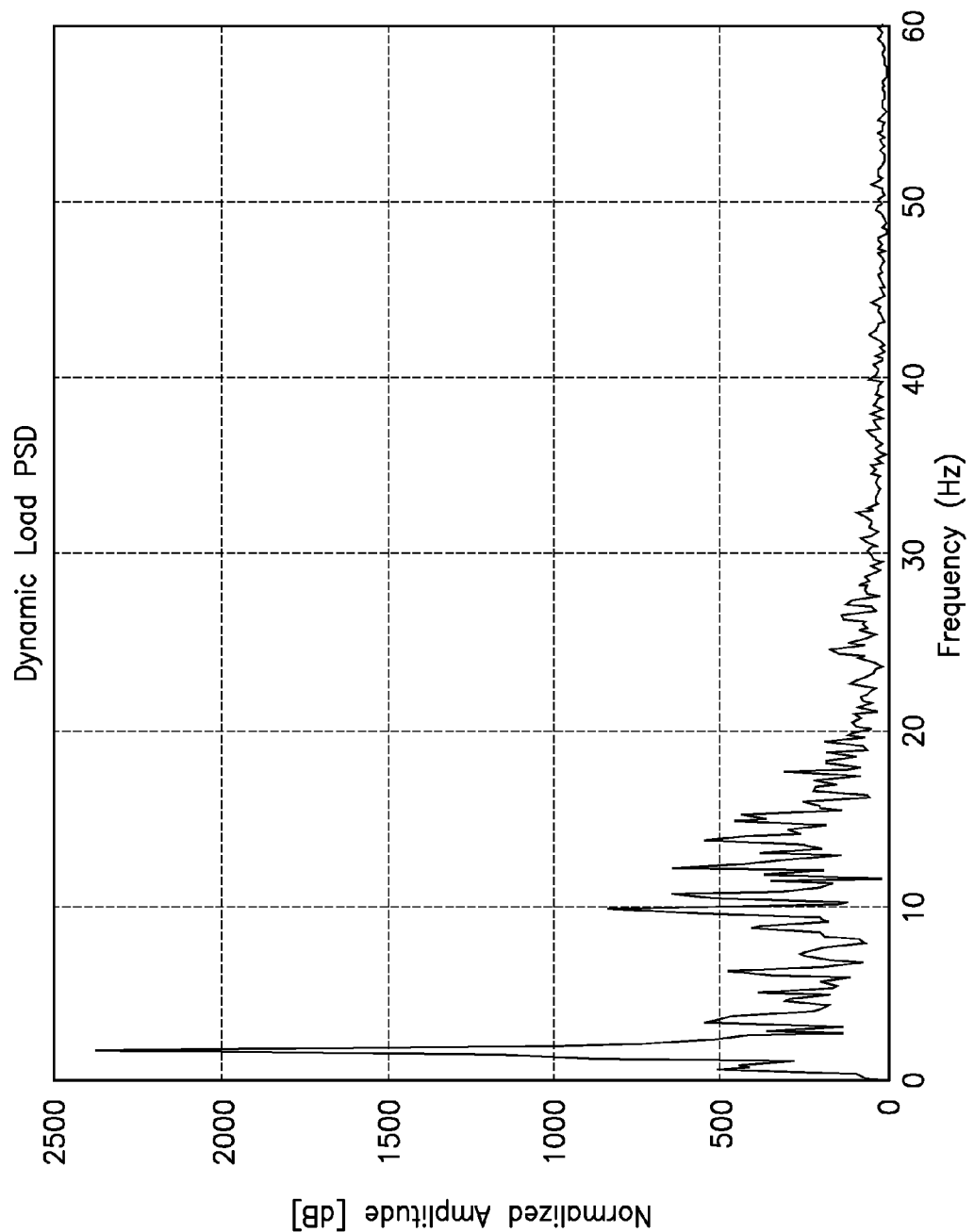

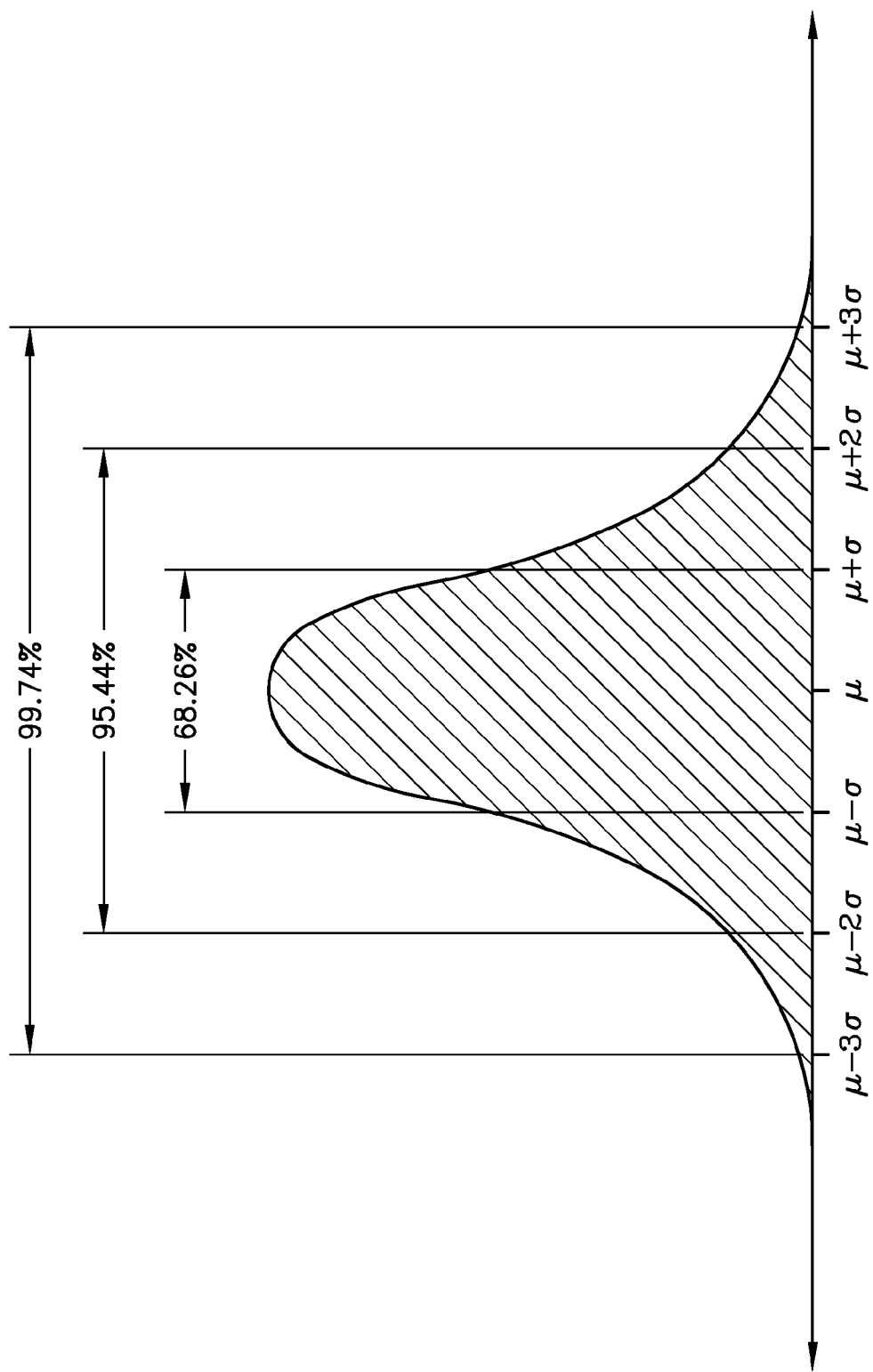

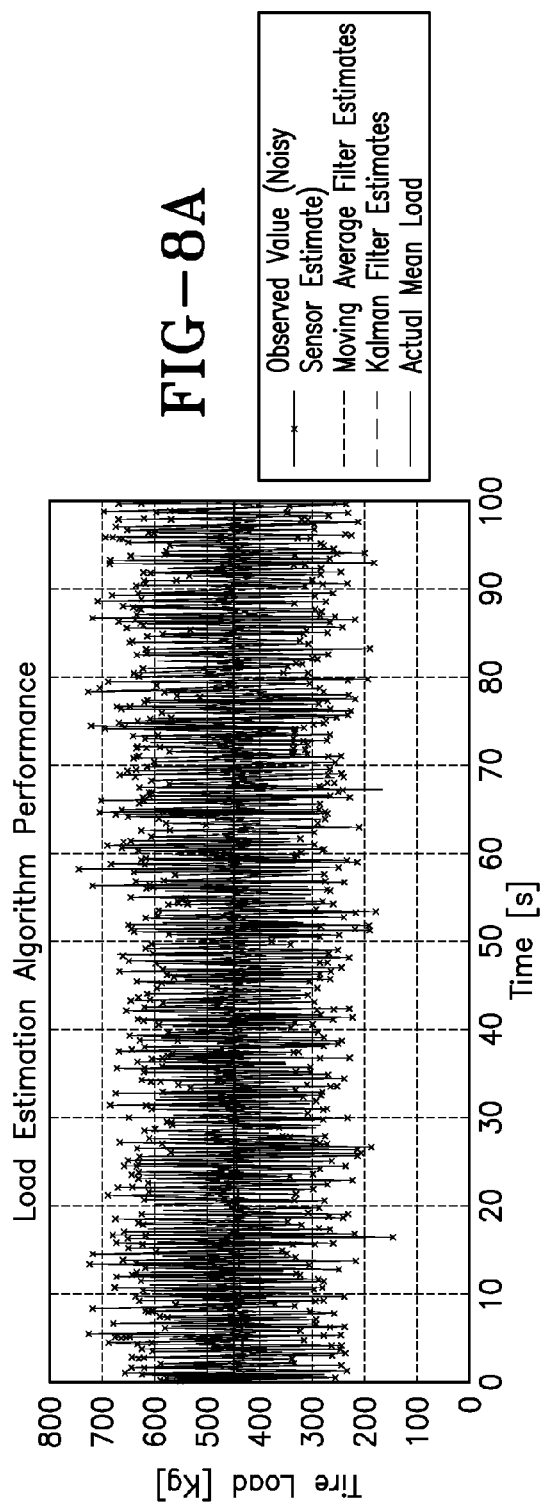
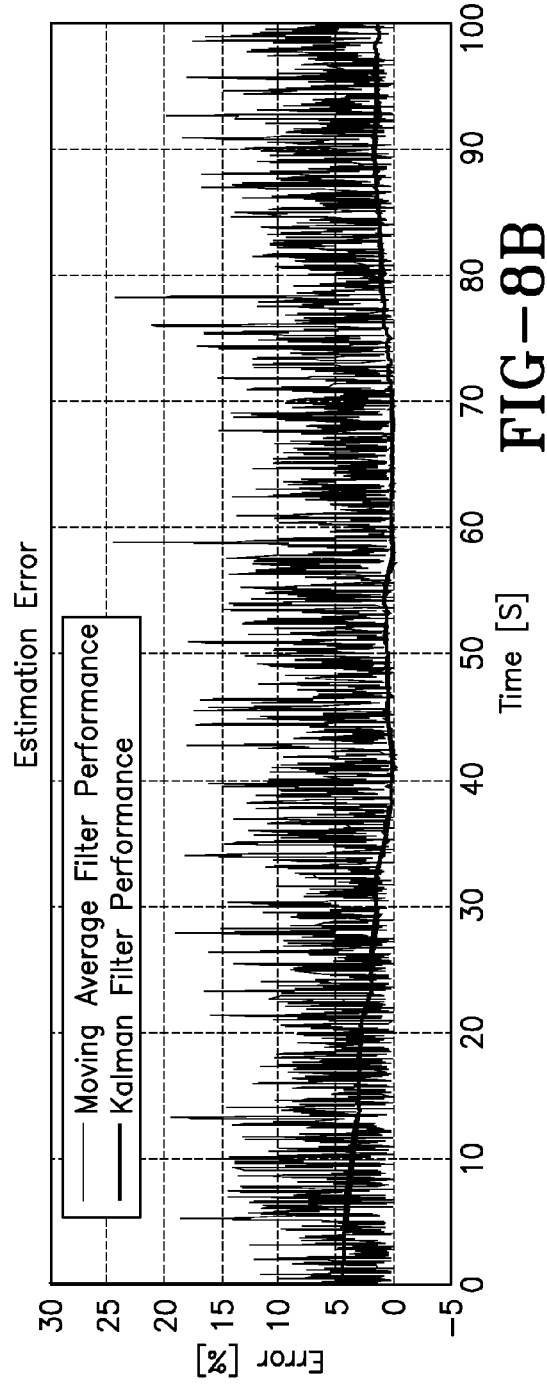

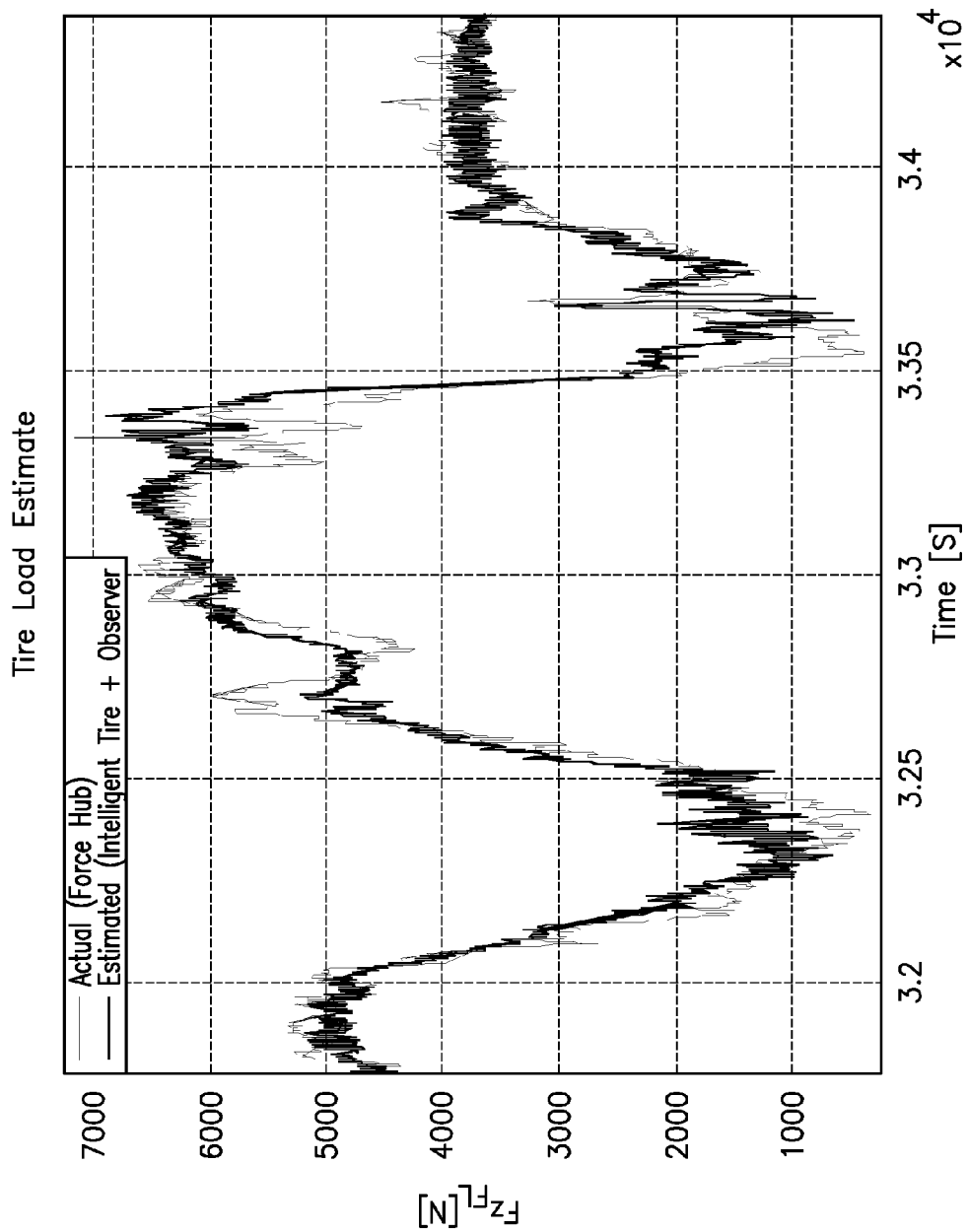

VEHICLE DYNAMIC LOAD ESTIMATION SYSTEM AND METHOD

FIELD OF THE INVENTION

The invention relates generally to tire monitoring systems for collecting measured tire parameter data during vehicle operation and, more particularly, to systems and method generating for estimating vehicle tire loading based upon such measured tire data.

BACKGROUND OF THE INVENTION

Vehicle-mounted tires may be monitored by tire pressure monitoring systems (TPMS) which measure tire parameters such as pressure and temperature during vehicle operation. Data from TPMS tire-equipped systems is used to ascertain the status of a tire based on measured tire parameters and alert the driver of conditions, such as low tire pressure or leakage, which may require remedial maintenance. Sensors within each tire are either installed at a pre-cure stage of tire manufacture or in a post-cure assembly to the tire.

Other factors such as tire loading are important considerations for vehicle operation and safety. It is accordingly further desirable to measure tire loading and communicate load information to a vehicle operator and/or vehicle systems such as braking in conjunction with the measured tire parameters of pressure and temperature.

SUMMARY OF THE INVENTION

According to an aspect of the invention, a dynamic load estimation system and method is provided, the system including at least one tire supporting a vehicle; at least one vehicle-mounted acceleration sensor for determining a vehicle lateral acceleration and a vehicle longitudinal acceleration; a roll angle calculating model for determining a vehicle roll angle; a roll rate calculating model for determining a vehicle roll rate; a static normal load calculation model for calculating a measured static normal load; and a dynamic tire load estimation model for calculating an estimated dynamic load on the tire from the measured static normal load, the vehicle roll angle, the vehicle roll rate, the vehicle lateral acceleration and the vehicle longitudinal acceleration.

In another aspect, the dynamic load estimation system includes at least one tire sensor for determining a measured load transfer force on the one tire; an adaptive load transfer ratio estimation model for determining an adaptive load transfer ratio estimation based on the vehicle lateral acceleration and the vehicle longitudinal acceleration; a load transfer ratio generating model for determining a load transfer ratio from the measured load transfer force and the adaptive load transfer ratio estimation; and a roll angle estimation model for generating a roll angle estimation based on the load transfer ratio.

Pursuant to a further aspect, the dynamic load estimation system includes a parameter adaptation model for generating a parameter adaptation adjustment; whereby the roll angle estimation model generates the roll angle estimation based on the load transfer ratio as adjusted by the parameter adaptation adjustment.

The dynamic load estimation system, in another aspect, includes at least one roll rate sensor means for determining a measured roll rate; and a filter model, such as a Kalman filter, for determining the vehicle roll angle and the vehicle roll rate from the measured roll rate and the roll angle estimation. A lateral model-based roll state estimator, such as a Luenberger observer model, may be used to operably determine the vehicle roll angle and the vehicle roll rate from the roll angle estimation and the vehicle lateral acceleration.

DEFINITIONS

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"CAN bus" is an abbreviation for controller area network.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Kalman Filter" is a set of mathematical equations that implement a predictor-corrector type estimator that is optimal in the sense that it minimizes the estimated error covariance—when some presumed conditions are met.

"Lateral" means an axial direction.

"Lateral edges" means a line tangent to the axially outermost tread contact patch or footprint as measured under normal load and tire inflation, the lines being parallel to the equatorial centerplane.

"Luenberger Observer" is a state observer or estimation model. A "state observer" is a system that provide an estimate of the internal state of a given real system, from measurements of the input and output of the real system. It is typically computer-implemented, and provides the basis of many practical applications.

"MSE" is an abbreviation for Mean square error, the error between and a measured signal and an estimated signal which the Kalman Filter minimizes.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"PSD" is Power Spectral Density (a technical name synonymous with FFT (Fast Fourier Transform).

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 4A is a graph of system response showing sprung mass displacement over time and the effect of road input disturbance under the conditions: straight line driving; no load lateral transfer; and only road input disturbance.

FIG. 4B is a graph of relative displacement between sprung mass displacement and road input over time under the same conditions as FIG. 4A.

FIG. 4C is a frequency response graph of normalized sprung mass acceleration PSD showing normalized sprung mass displacement amplitude [dB] vs. frequency (Hz).

FIG. 5A is a dynamic load variation graph comparing static load to dynamic load over time.

FIG. 5B is a dynamic load variation graph showing load variation as a percentage over time.

FIG. 5C is a frequency response graph of dynamic load PSD of unsprung mass displacement amplitude [dB] vs. frequency (Hz).

FIG. 7 is a measurement noise normal distribution statistical graph showing a standard deviation under a static load of 100 Kg for a passenger car of 500 Kg.

FIG. 8A is a graph of tire load (Kg) over time showing load estimation algorithm performance.

FIG. 8B is an estimation error graph showing error in percentage over time and comparing the moving average filter performance to the Kalman Filter performance.

FIG. 17D is an exploded graph portion of FIG. 17C showing the correlation in detail.

DETAILED DESCRIPTION OF THE INVENTION

Figure 1A:
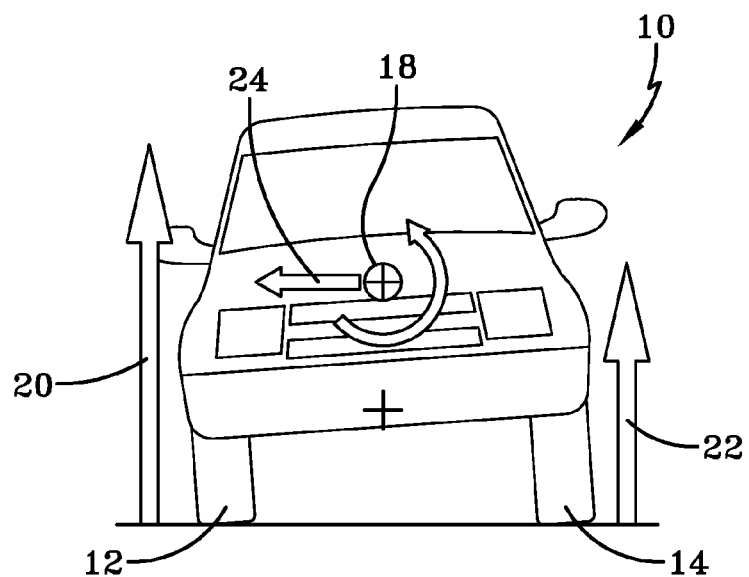
FIG. 1A is a diagrammatic view of a vehicle showing lateral dynamics.
Figure 1B:
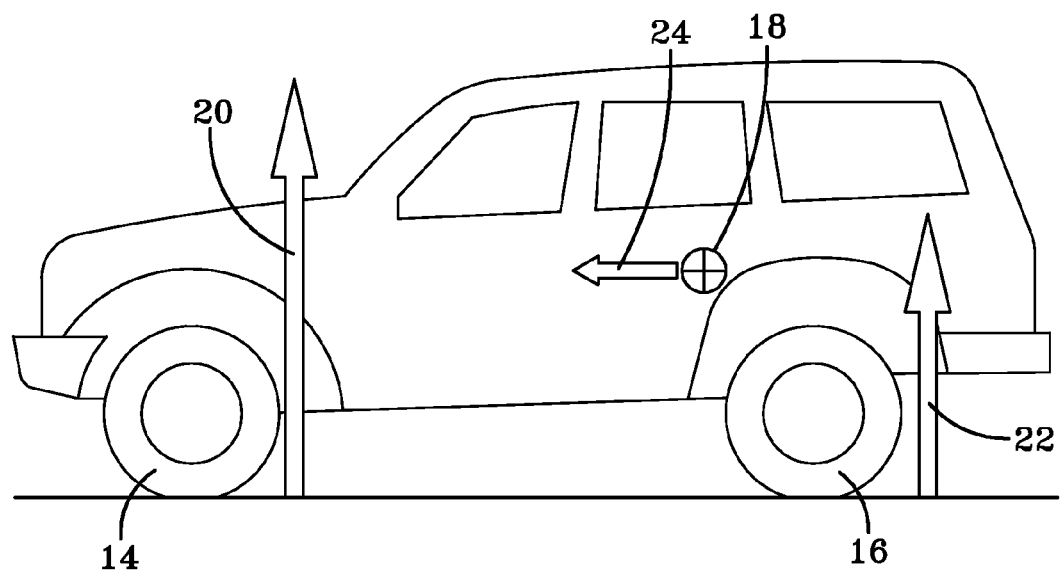
FIG. 1B is a diagrammatic view of a vehicle showing longitudinal dynamics.

Referring to FIG. 1, a representative vehicle 10 is shown supported by tires 12, 14, 16 and having a center of gravity (CG)18. The dynamic tire load estimation system analyzes vehicle lateral dynamics represented by force vectors 20, 22 and vehicle lateral dynamics 24. The vertical tire forces can be estimated by the summation of longitudinal load transfer, lateral load transfer and static normal force on each tire (front right, front left, rear right, and rear left) as indicated by the mathematical statements below in which the nomenclature applies:

a: Distance from CG to front axle
b. Distance from CG to rear axle
$a_y$: Lateral acceleration
$a_x$: Longitudinal acceleration
$\theta$: Roll angle
$\theta'$: Roll rate
t: Track width
$m_s$: Sprung mass
$m_u$: Unsprung mass
$k_{roll}$: Roll stiffness
$c_{roll}$: Roll damping
$h_r$: Roll center height
$h_u$: Height of unsprung mass $$F_{Zfl} = F_{static(fl)} - W_{Lateral\ Load\ Transfer} - W_{longitudinal\ Load\ Transfer}$$

$$F_{Zfr} = F_{static\ fr} + W_{Lateral\ Load\ Transfer} - W_{Longitudinal\ Load\ Transfer}$$

$$F_{Zrl} = F_{Staticrl} - W_{Lateral\ Load\ Transfer} + W_{Longitudinal\ Load\ Transfer}$$

$$F_{Zrr} = F_{Staticrl} + W_{Lateral\ Load\ Transfer} + W_{Longitudinal\ Load\ Transfer}$$

$$W_{Lateral\ Load\ Transfer} = \frac{[m_s * h_r + m_u * h_a * a_y]}{t} + \frac{[k_{roll} * \theta + c_{roll} * \theta']}{t}$$

$$W_{Longitudinal\ Load\ Transfer} = \frac{m_s * h_r * a_x}{2(a+b)}$$

The mathematical statement below presents a dynamic estimation of tire load in real time in which $F_{Zstatic}$ is the Static tire load; $a_y$: Lateral acceleration; $a_x$: Longitudinal acceleration; $\theta$: Roll angle; $\theta'$: Roll rate.

$$F_{Zdynamic} =$$
$$F_{Zstatic} \pm \frac{[(m_s * h_r + m_u * h_a) * a_y)]}{t} + \frac{(k_{roll} * \theta + c_{roll} * \theta')]}{t} \pm \frac{[m_s * h * a_x]}{2(a+b)}$$

As will be understood, $F_{Zstatic}$, $a_y$, $a_x$, $\theta$, $\theta'$ represent inputs for determining load estimation. There is a need to account for the static axle load variations due to the state of loading of the vehicle (i.e. percent payload) and oscillations at body bounce and wheel hop frequencies. The lateral acceleration and longitudinal acceleration values are obtained from standard sensors available on vehicles equipped with ABS/VSC Controllers. In addition, the roll rate is attainable on vehicles equipped with active safety systems for side-curtain airbag deployment. For those vehicles which are not equipped to provide the roll rate, a means for estimating the roll rate is provided and explained below under a Case 2 scenario. The roll angle is obtained from sensors to measure roll angle but such sensors are expensive and estimates of roll angle, while possible to obtain through pure integration of the roll rate, is extremely sensitive to sensor bias.

Accordingly, pursuant to the subject system and method, the steady state load estimates are improved by accounting for the static axle load variations. The inputs above for load estimation algorithm will be explained in further detail following.

Figure 2:
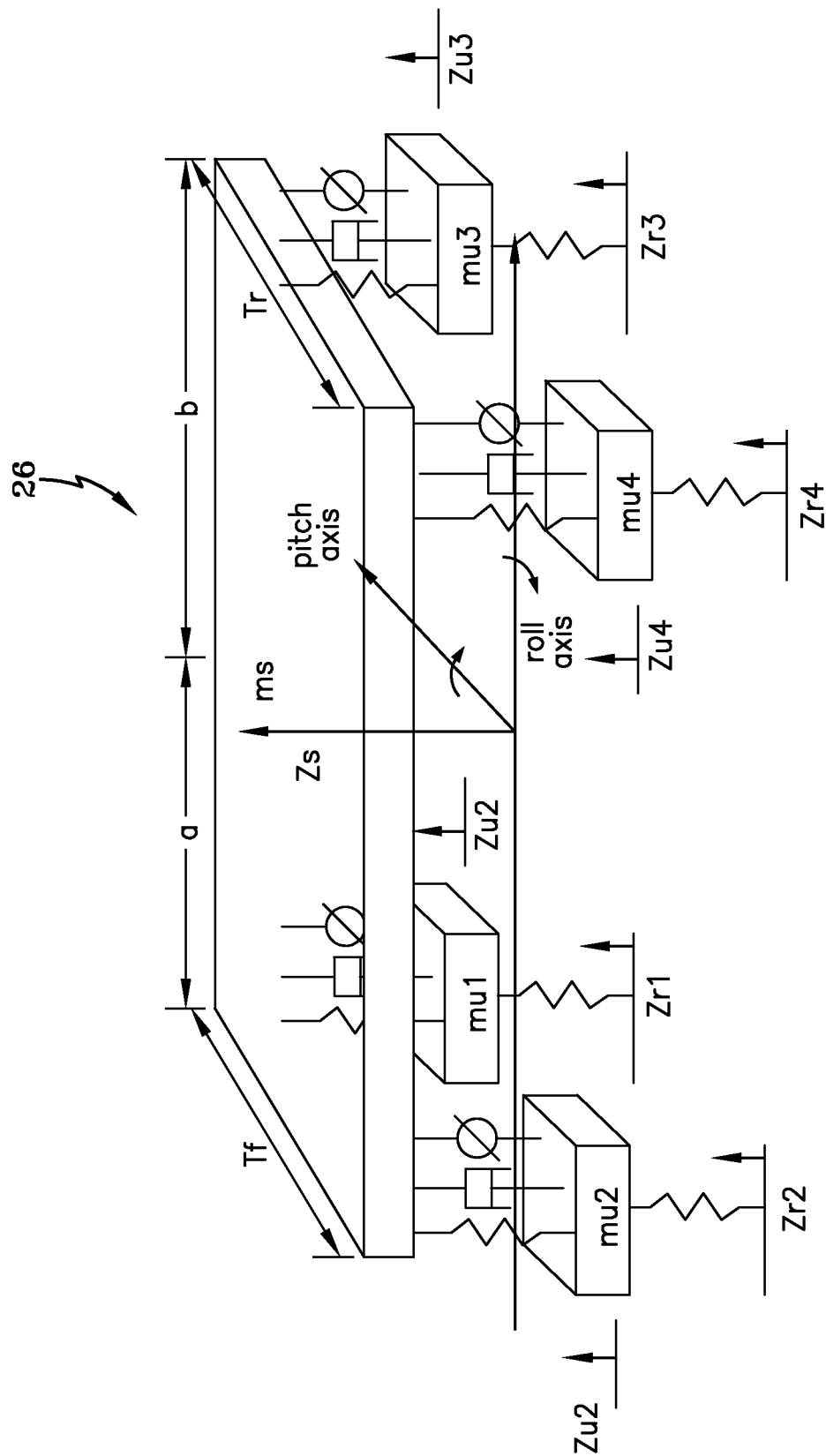
FIG. 2 is a full car suspension model showing effects of factors which cause tire load variations under steady-state (constant speed) straight-line driving conditions.
Figure 3:
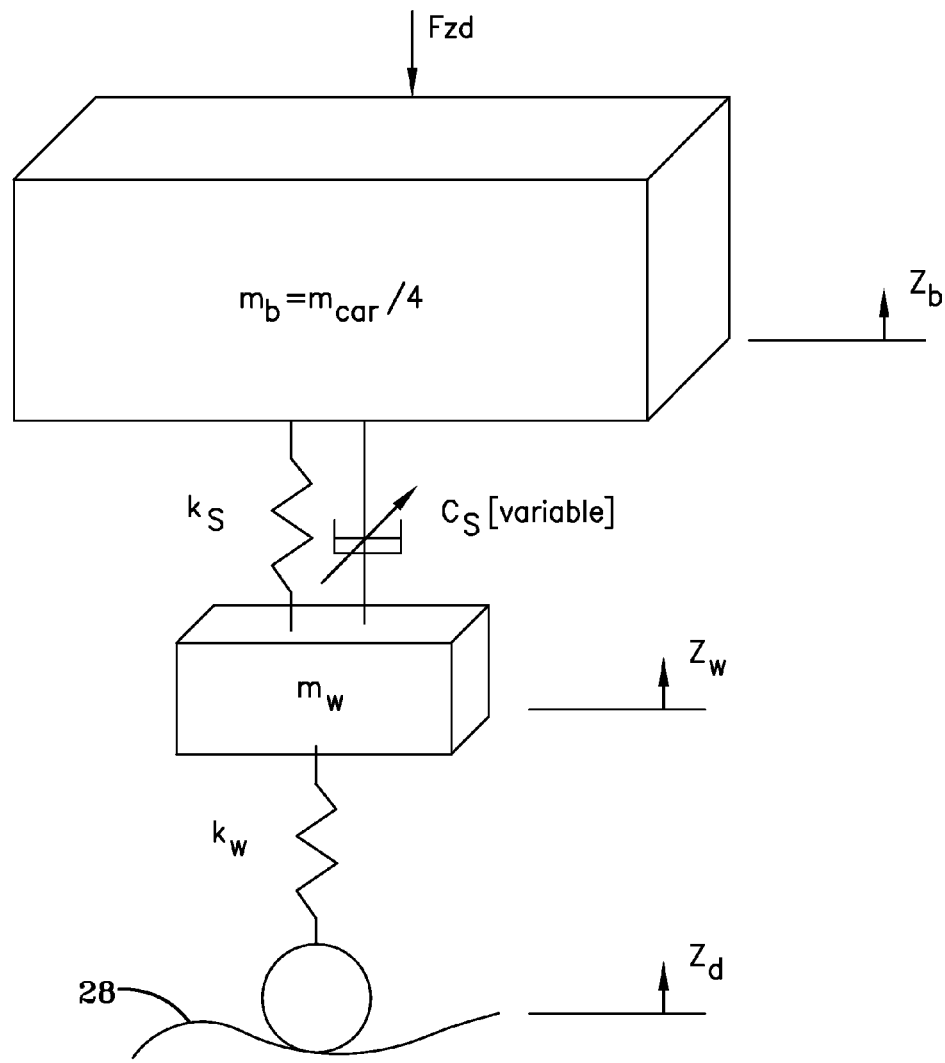
FIG. 3 is a system input model showing the disturbance vector during cornering and/or braking.

A representation of a full car suspension model 26 is provided in FIG. 2. From the model, the factors which cause tire load variations under steady-state (constant speed) straight-line driving conditions may be analyzed. FIG. 3 shows the disturbance vector as being composed of the load off-set of the vehicle during cornering and/or braking (Fzd) and the road profile 28 input (Zd). The mathematical statements set forth in FIG. 3 apply to the system of FIG. 2.

Figure 4D:
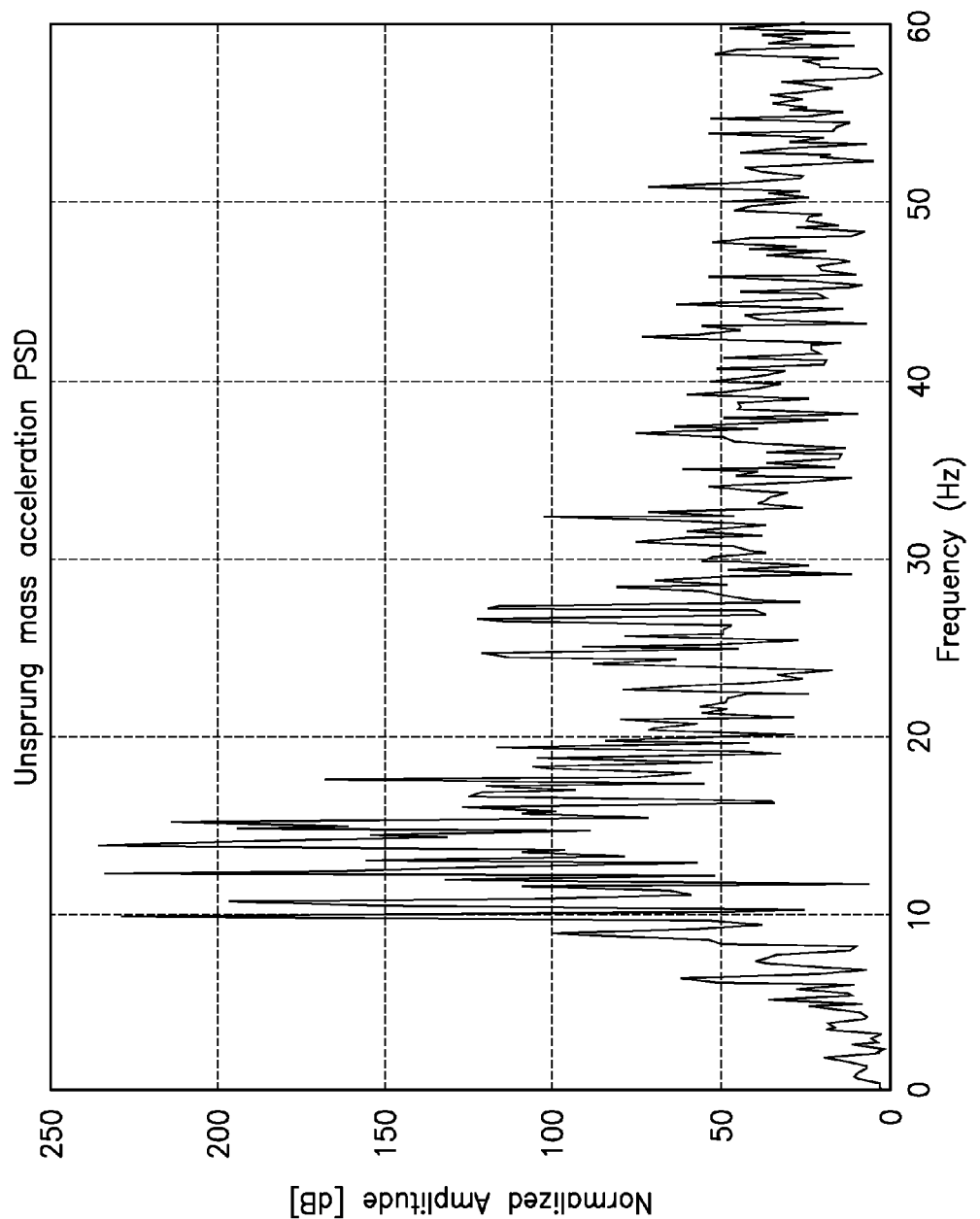
FIG. 4D is a frequency response graph of unsprung mass acceleration PSD showing unsprung mass displacement amplitude vs. frequency.

With reference to FIGS. 4A through 4D, the system response and PSD (Power Spectral Density) Analysis is summarized in graphical form. The simulation conditions are: straight line driving; no load lateral transfer; and only disturbance is due to the road variation inputs at a vehicle speed of approximately 51.44 mph. The displacement (mm) vs. time is shown in FIG. 4A correlates road input with displacement of sprung mass. The FIG. 4B graph shows relative displacement of sprung mass displacement over time. FIG. 4C shows the sprung mass acceleration PSD as the normalized amplitude [dB] vs. frequency (Hz). In FIG. 4D, the unsprung mass acceleration PSD is shown, graphing normalized amplitude [dB] vs. frequency (Hz). From FIGS. 4A-4D, it will be seen that the frequency response extends from approximately 0.5 to 20 Hz with emphasis on roughness at the body bounce frequency (aprrox. 1 Hz) and the axle resonance frequency (approx. 10 Hz.

Figure 6:
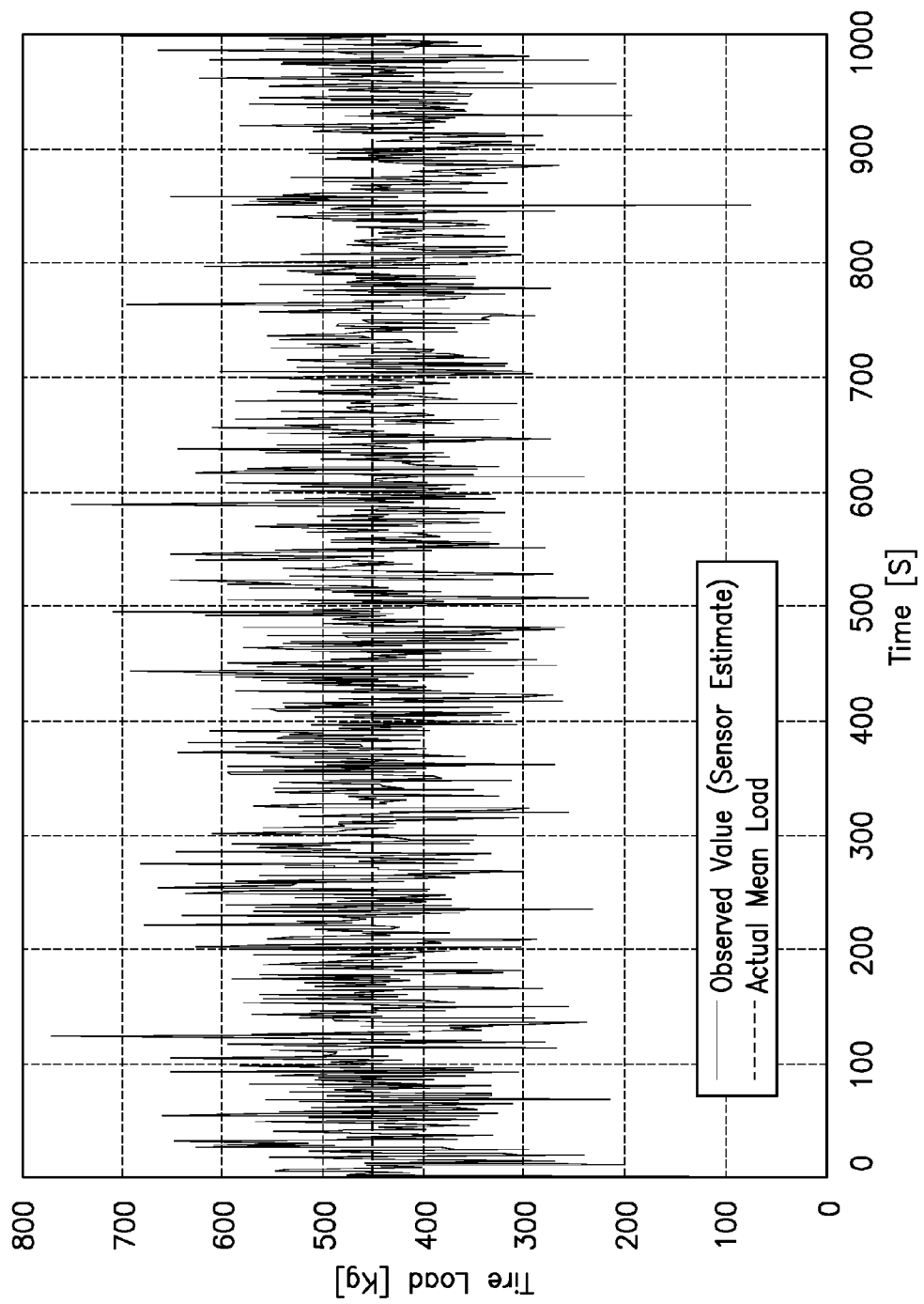
FIG. 6 is a graph comparing Observed Load Value (Kg) from Sensor Estimate to Actual Mean Load. over time.

A dynamic load variation study is summarized graphically in FIGS. 5A through 5C. In FIG. 5A, the dynamic load variation is shown comparing a static load to a dynamic load (Kg) over time. In FIG. 5B the variation as a percentage in shown. FIG. 5C shows the dynamic load PSD as Normalized Amplitude [dB] vs. Frequency (Hz). As will be understood from the graphs, the tire load variations even under steady-state straight-line driving conditions may be as high as 20 percent. This means that, for a tire based load estimation system, noisy estimates of tire load may occur even under steady-state driving conditions. As shown in FIG. 6 which graphs load variation under constant speed straight-line test conditions, a comparison of observed value (sensor estimate) vs. actual mean load may vary between 15 to 20 percent.

Since noise may have a significant impact on load estimation, the Kalman Filter (explained following) must compensate for such a variation. In FIG. 7, a normal distribution curve for noise statistics is shown with the mean=0. A standard deviation of 20 percent of average tire load (static load) is seen to be approximately equal to 100 Kg. The graph is for a static tire load for a passenger car of approximately 400 Kg.

Figure 11:
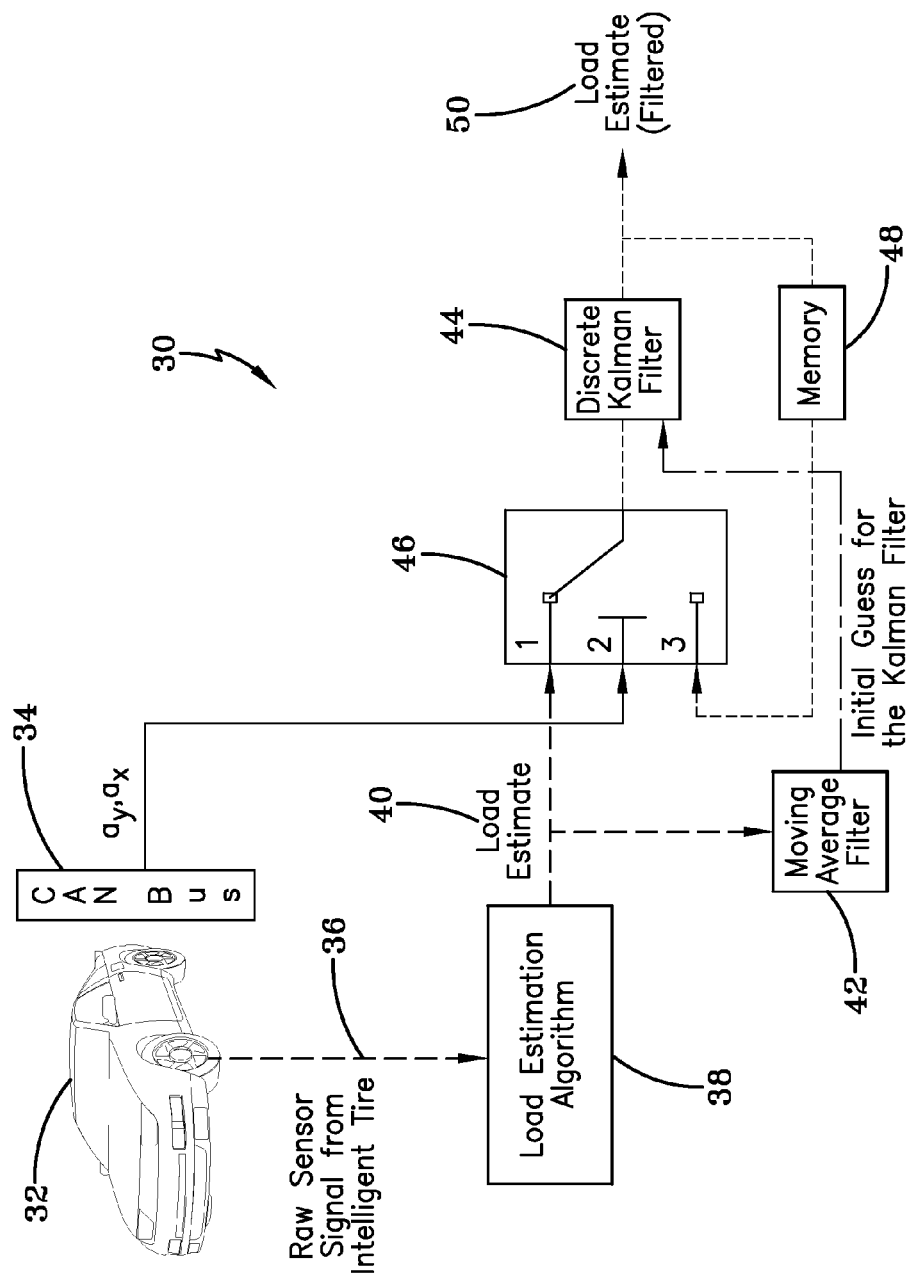
FIG. 11 is a diagrammatic representation of the static tire load estimation algorithm.

With reference to FIG. 11, a static tire load estimation algorithm 30 is shown. A vehicle 32 has tires equipped with a sensor which detects tire deformation indicative of a static load on each tire. The vehicle is equipped with a stability control system which provides a CAN Bus 34. Sensors generate acceleration data $a_x$, $a_y$. A static load estimation system of the subject type is described in co-pending U.S. patent application Ser. No. 13/655,787 filed on Oct. 19, 2012, incorporated herein by reference. The sensor(s) in each tire generate a raw sensor signal 36 is inputted into a digital signal processor chip 38 and used in a load estimation algorithm in the generation of a load estimate 40. The sensors provide static load data from each tire on a low frequency basis. The load estimate 40 is used in a moving average filter 42 and an initial guess is thereby generated for a discrete Kalman Filter 44. The load estimate 40 is further input to a switch 44 with acceleration data $a_x$, $a_y$ from the CAN Bus 34. The switch 44 is programmed to pass through input 1 (Load Estimate 40) when the input 2 (acceleration data from CAN Bus 34) satisfies the selected criterion. Otherwise, the switch 44 passes through input 3, representing feedback from the (filtered) Load Estimate 50.

The switch selection criterion is defined as follows:

Ay and Ax approximately equal 0; and $F_{Zfl}$ approximately equal $F_{Zfr}$; and $F_{Zrl}$ approximately equal $F_{Zrr}$; no cornering, braking and acceleration G-forces and no weight transfer due to road disturbances. If the criterion is met at input 2, input 1 is passed through. Memory 48 input into the switch 44 controls application of the throughput criteria above.

Figure 9:
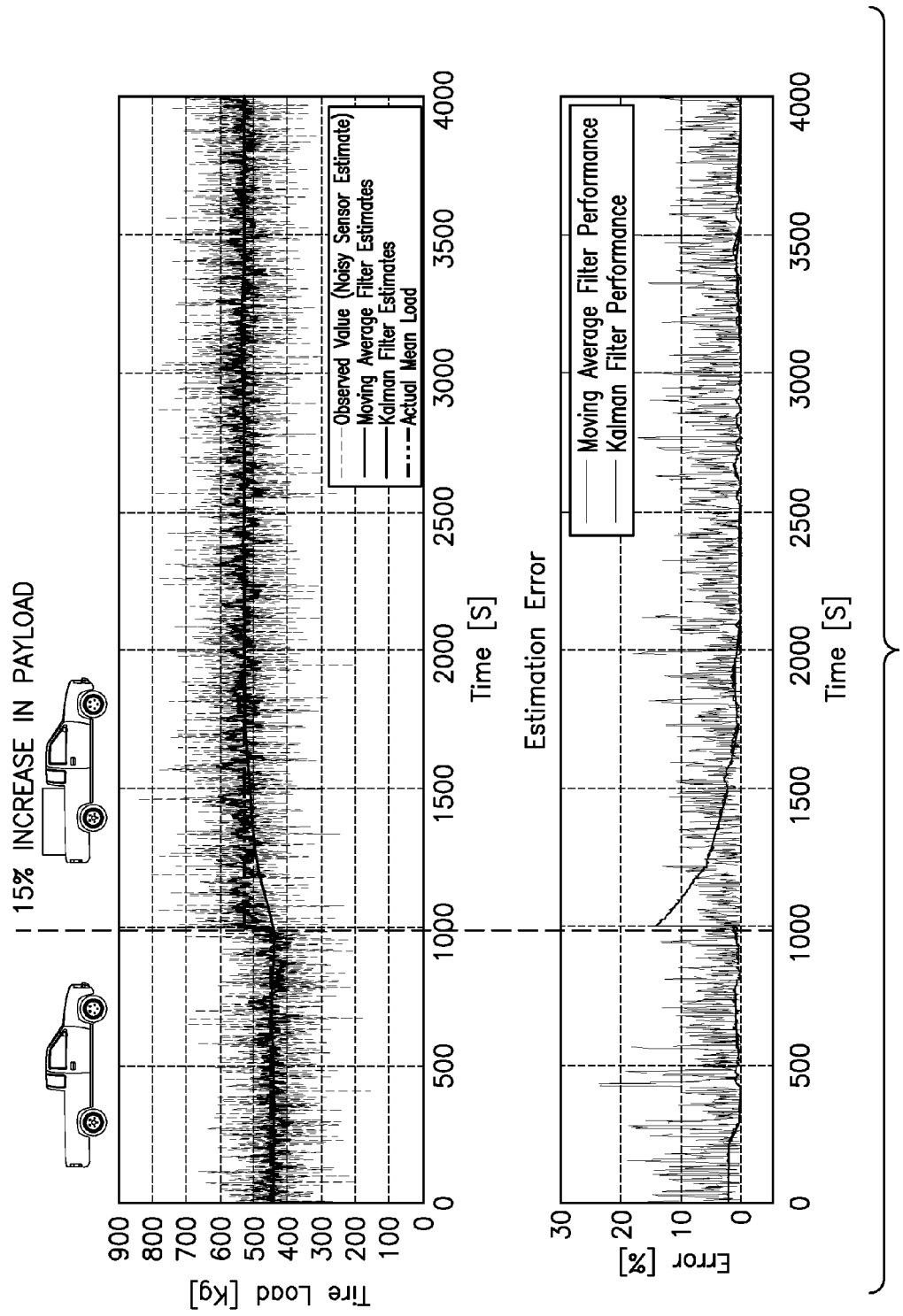
FIG. 9 is a pair of graphs of the effect a fifteen percent increase in payload has on tire load estimation and estimation error (percent).

A discrete Kalman Filter 44 is deployed, taking the output from switch 44 and the initial guess from the Moving Average Filter 42 and generating a filtered Load Estimate 50 therefrom. A significant error in the Kalman filter based load estimate may occur due to a wrong initial guess as shown in FIG. 9. In FIG. 9, a 15 percent increase in payload is shown as the tire load [Kg] over time indicates. The observed value (Noisy Sensor Estimate) is graphed against the Moving Average Filter Estimates, the Kalman Filter Estimates and the Actual Mean Load. In the Estimation Error graph of FIG. 9, error as a percentage is graphed over time for both the Moving Average Filter Performance and the Kalman Filter Performance.

Figure 10:
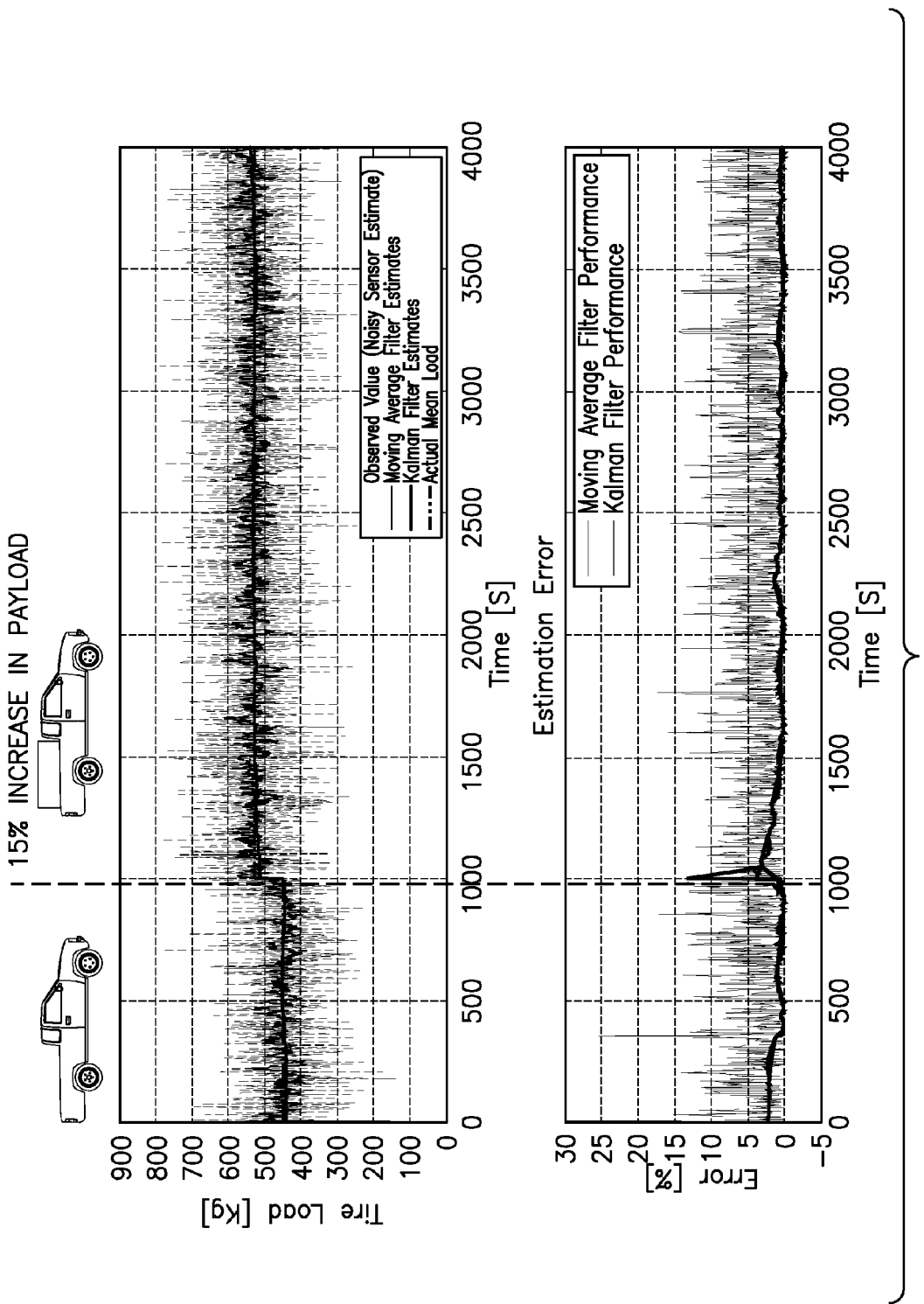
FIG. 10 is a pair of graphs of the effect a fifteen percent increase in payload has on tire load estimation and estimation error (percent) and showing improved performance of the Kalman filter with a better initial guess.

Using the moving average filter output as an initial guess for the Kalman filter reduces error by improving the initial guess as indicated by the graphs of FIG. 10. In FIG. 10, the tire load [Kg] estimate is shown before and after a 15 percent payload increase using the improved initial guess and error (percent) over time reflects an improvement in the performance of the Kalman filter with the better initial guess.

Figure 12A:
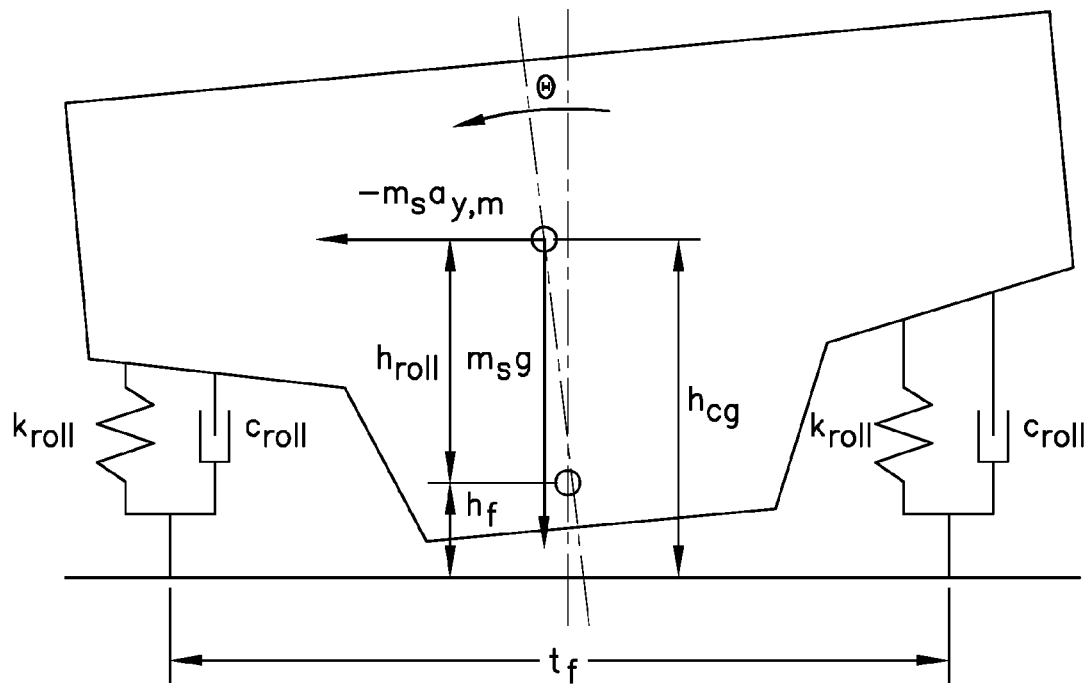
FIG. 12A is a diagrammatic representation of a model based roll angle estimator.

For a dynamic load estimate, as discussed previously, $F_{ZStatic}$; $a_x$; $a_y$; $\theta$ (roll angle) and $\theta'$ (roll rate) are inputs. In order to improve the dynamic load estimate over the static load estimate of FIG. 11, use of roll angle $\theta$ is introduced. Sensors to measure the roll angle are expensive and estimates of roll angle through integration of roll rate is subject to error due to sensor bias. A tire load based steady state roll angle estimation may be used to estimate roll angle using tire load information from a sensor-equipped tire by summing the moments about the front and rear roll centers. FIG. 12A shows a model based roll angle estimator. By summing the moments, the expression for roll angle below is derived wherein LTR is the load transfer ration equal to the Load on left tires minus Load on right tires divided by Load on all tires.

$t_r$: Front track width;
$a_y$: lateral acceleration;
$h_f$, $h_r$: Front and rear roll center heights;
$k_f$, $k_r$: Front and rear roll stiffness;
$m_S$: Sprung mass;
m: total mass.

$$\theta = \frac{LTR*t_f/2 - \frac{m_s*a_y}{m*g}*(h_f)}{\frac{(k_f+k_r)}{m*g}}$$

The model based roll angle estimator of FIG. 12 as is based on the 1DOF (single degree of freedom) vehicle model with roll-rate measurement. The states are roll angle and roll rate, while the input is the measured lateral acceleration. The feedback signal is the measured roll rate. The following expression applies where: $a_{y,m} = a_y + g \sin(\theta)$ $$(I_x + m_s h^2_{roll})\theta'' + c_{roll}\theta' + k_{roll}\theta = -m_s h_{roll} a_{y,m}$$

Figure 12B:
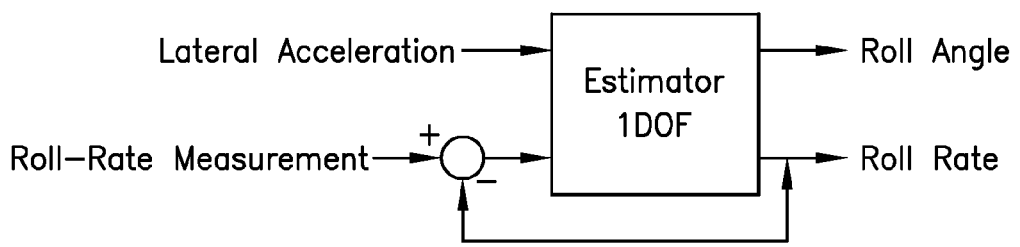
FIG. 12B is a flow diagram of the roll angle estimator.
Figure 12C:
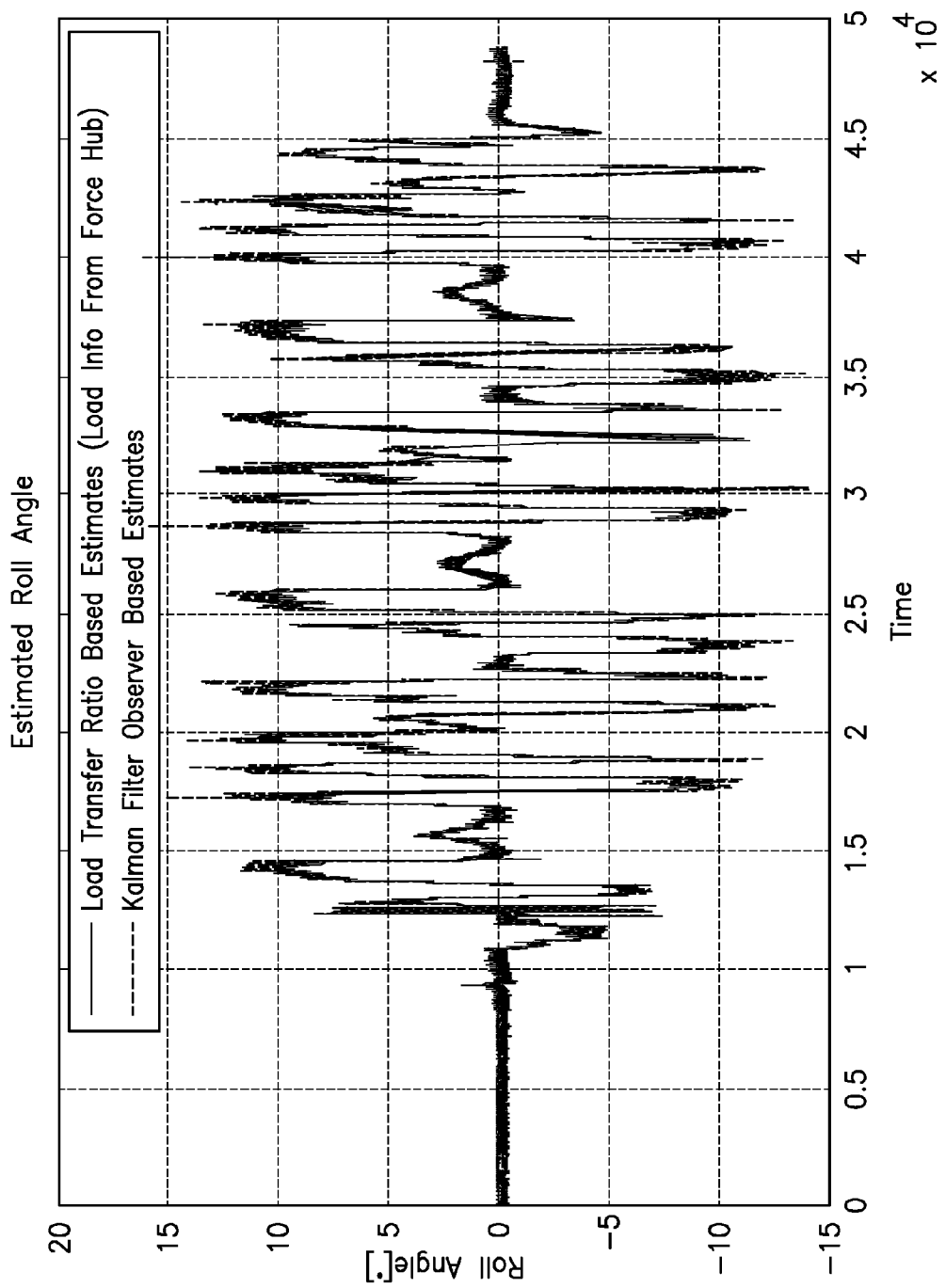
FIG. 12C is a graph of estimated roll angle comparing load transfer based estimates to the Kalman Filter observer based estimate.

FIG. 12B shows the roll angle estimator based on the model of FIG. 12A. Measured lateral acceleration is a combination of the vehicle acceleration and the gravitational force. Validation of the roll angle estimation is experimentally validated as seen in the graph of FIG. 12C. In FIG. 12C, the roll angle estimated over time is graphed showing the Load Transfer Ratio Based Estimates (Load information from the Force Hub) and the Kalman Filter Observer-based Estimates. Good estimates of roll angel are achieved using the tire load information (Method 1). The Method 2 output is used as a reference value for comparison. However, the assumption of having continuous tire load information from an intelligent tire (i.e., a tire equipped with deformation detecting sensors) is not realistic since the tire load information system is a single point sensor system, i.e. tire load estimates are only generated once per revolution of the tire. Accordingly, the dynamic load estimation system disclosed takes the low frequency generated information from a sensor-equipped tire and, using such information, generate a roll angle estimate and, using the roll angle estimate with the roll rate and acceleration information from a vehicle CAN Bus, calculates a dynamic tire load estimation.

Figure 13:
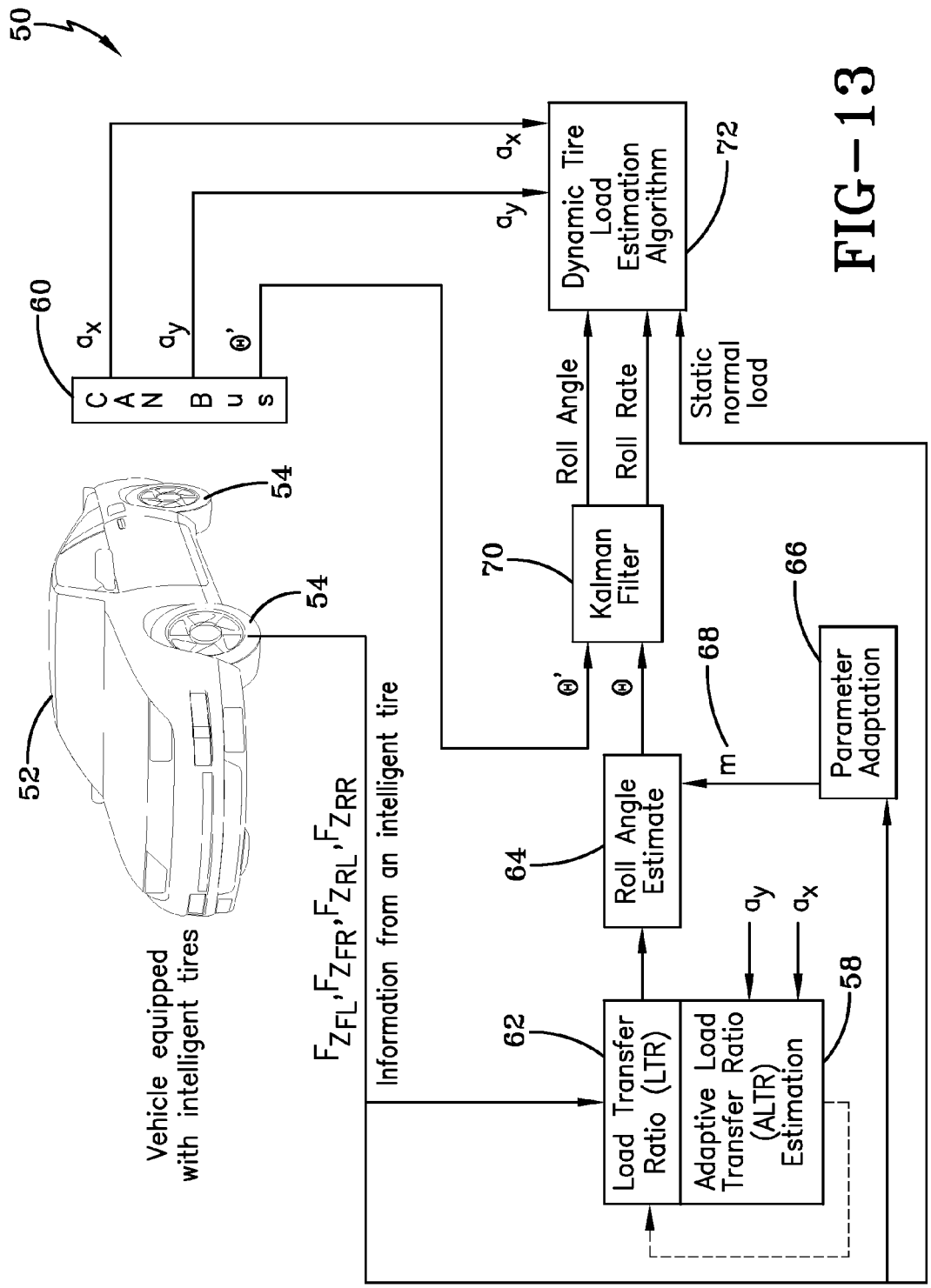
FIG. 13 is a Case 1 diagram of the dynamic tire load estimation algorithm where the roll rate is known.
Figure 15:
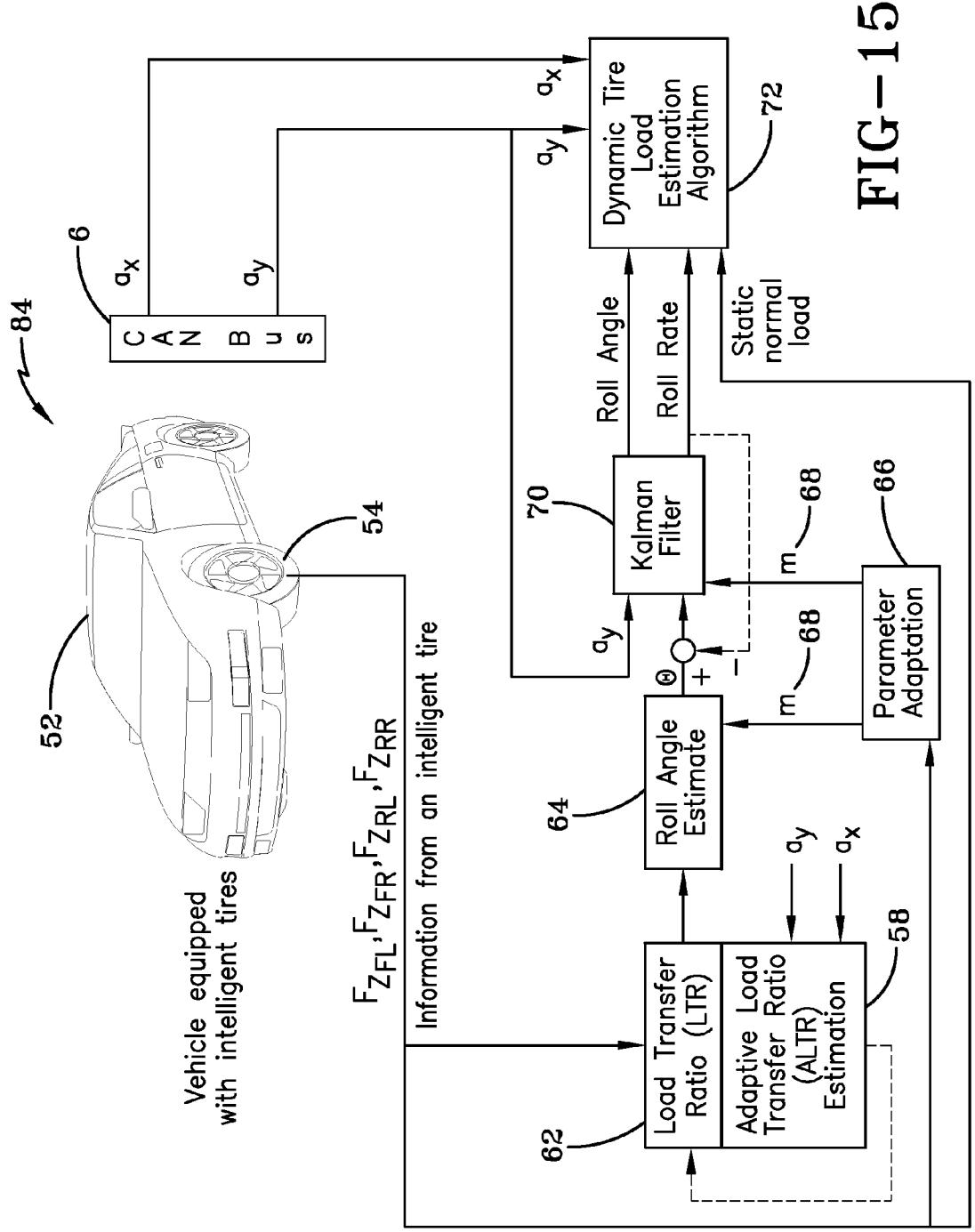
FIG. 15 is a Case 2 scenario diagram of the dynamic tire load estimation algorithm where the roll rate is unknown.

The dynamic tire lead estimation algorithm is discussed in the following two cases. The first, represented in FIG. 13, is the case wherein the vehicle is equipped with a stability control system capable of generating sensor-produced roll rate data. The second case, represented by FIG. 15, is where the vehicle is not equipped with a stability control system. Both cases are discussed as follows.

Case 1

Figure 14:
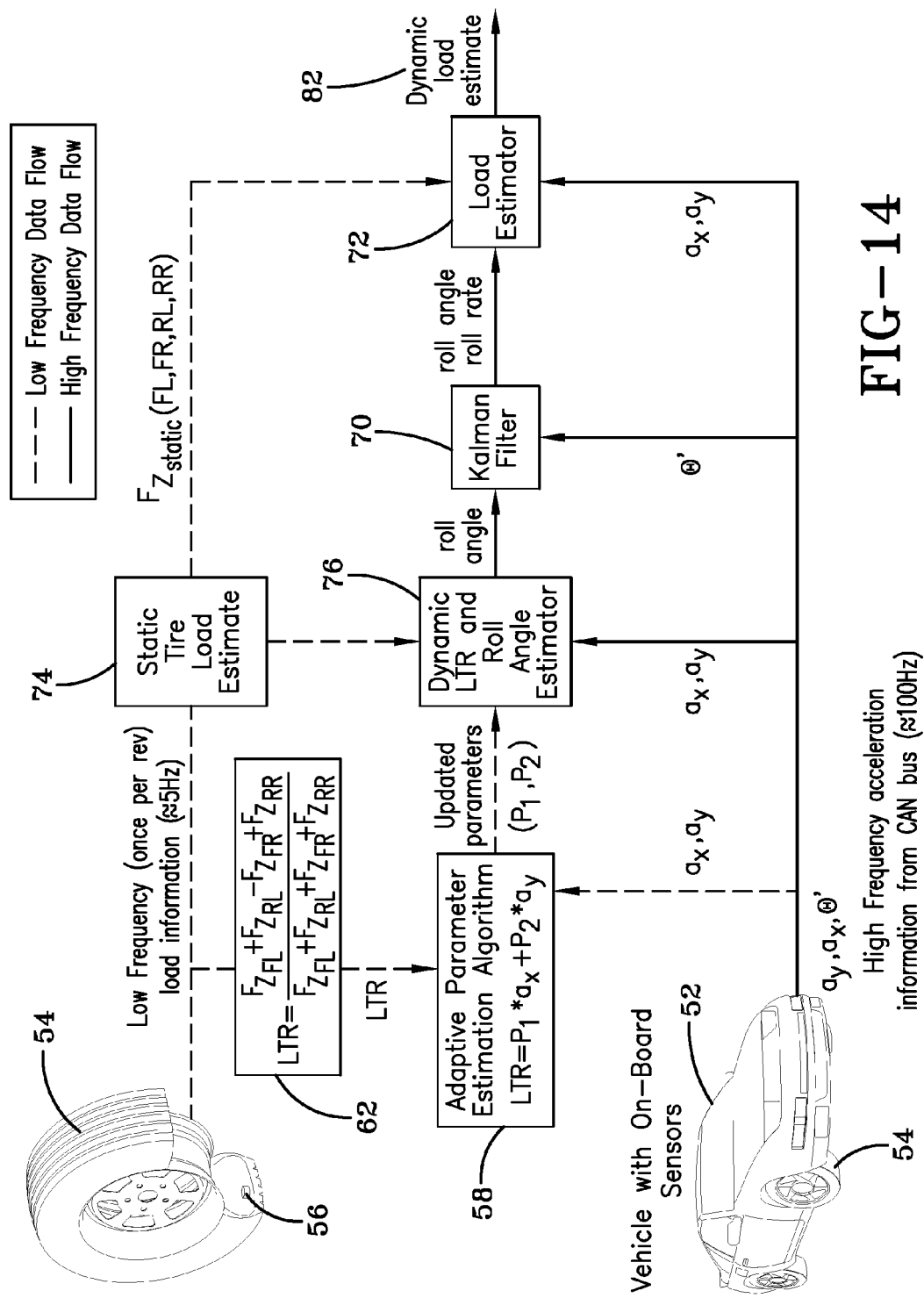
FIG. 14 is a data flow diagram of the dynamic load estimation algorithm for the Case 1 scenario.

Referring to FIG. 13 and FIG. 14, a dynamic tire load estimation algorithm system 50 is shown in FIG. 13 and a data flow diagram corresponding to the system in FIG. 14. The system includes a vehicle 52 having tires 54, each tire equipped with one or more static load sensors 76 from which to calculate on a low frequency basis (once per revolution) a static loading on each tire. Load Data $F_{ZFL}$, $F_{ZFR}$, $F_{ZRL}$, $F_{ZRR}$ is thus obtained. A static tire load estimate methodology 74 is used to estimate a total static loading $F_{Zstatic}$ on all of the tires. The static load estimate methodology is disclosed in co-pending U.S. patent application Ser. No. 13/655,787 filed on Oct. 19, 2012, incorporated herein by reference.

A static load transfer ratio (LTR) 62 is calculated through use of the low frequency static loading data in the following expression:

$$LTR = \frac{F_{ZFL} + F_{ZRL} - F_{ZFR} + F_{ZRR}}{F_{ZFL} + F_{ZRL} + F_{ZFR} + F_{ZRR}} \quad (1)$$

An Adaptive Load Transfer Ratio (ALTR) Estimation 58 is then made using the static load LTR in combination with the acceleration data $a_x$, $a_y$ from a vehicle CAN Bus 60. in the expression (2) below.

$$LTR = P_1 * a_x + P_2 * a_y \quad (2)$$

Using the high frequency acceleration data $a_x$, $a_y$ from CAN Bus (approx. 100 Hz) and the LTR from static loading on each tire, in formula (2), the parameters $P_1$ and $P_2$ may be identified. The LTR is input into a roll angle estimate 64. The vehicle mass information is also updated 66 with each static load measurement received from the tires 54.

Updated parameters $P_1$ and $P_2$ are in the data flow diagram of FIG. 14 applied with the static tire load estimate 74 and acceleration data $a_x$, $a_y$ to a Dynamic LTR and Roll Angle Estimator 76. The Dynamic LTR and Roll Angle Estimator 76 generates an estimated $\theta$ roll angle which is input into a Kalman Filter 70 with roll rate $\theta'$ data from the CAN Bus. The Kalman filter 70 determines as an output the roll angle and roll rate of the vehicle which inputs into a Load Estimator 72 with the $F_{Zstatic}$ output from estimate 74 and the acceleration data $a_x$, $a_y$. It will thus be appreciated that the low frequency load data is used to define the $P_1$ and $P_2$ parameters on a continuous low frequency basis, which are then used to modify the LTR input into the Dynamic LTRR and Roll Angle Estimator 76.

The data flow diagram for the system of FIG. 13 is provided in FIG. 14 with the low frequency data flow paths differentiated in broken line from the high frequency data flow paths. It will be appreciated that the static tire load estimate $F_{Zstatic}$ operates at a low frequency rate (once per revolution) to generate information at approximately 5 HZ. The static load transfer ratio of expression (2) is therefore recalculated at the same low frequency. The coefficients $P_1$ and $P_2$ change with the center of gravity CG of the vehicle. Thus, adapting the LTR on a continual basis by the coefficients serves to adapt the LTR to CG changes in the vehicle.

The vehicle 52 is provided with On-Board sensors in its stability control system from which to obtain via the CAN Bus the high frequency acceleration parameters $a_x$, $a_y$ as well as the roll rate $\theta'$. By applying the above updated parameters $P_1$ and $P_2$, continuously re-calculated using low frequency static loading data, to the high frequency acceleration data from the vehicle CAN Bus, a dynamic LTR and Roll Angle Estimator 56 may be employed to produce a dynamic roll angle estimation. The roll angle from the estimator 56 is input into a Kalman filter with the roll rate information $\theta'$ from the CAN Bus, to generate a dynamic roll angle 86 which, with the CAN Bus obtained roll rate $\theta'$ and acceleration data from the CAN Bus, input into a Load Estimator 72 and a Dynamic Load Estimate 82 made as described below.

The Dynamic Load Estimate 82 is made through application of ax, ay, $\theta$, $\theta'$ in the following expression (3), summarizing the moments from the models of FIGS. 2 and 3.

$$F_{Zdynamic} = F_{Zstatic} \pm \left[ \frac{(m_s * h_r + m_u * h_a) * a_y)}{t} + \frac{(k_{roll} * \theta + c_{roll} * \theta')}{t} \right] \pm \frac{[m_s * h_r * a_x]}{2(a+b)} \quad (3)$$

Case 2

Figure 16:
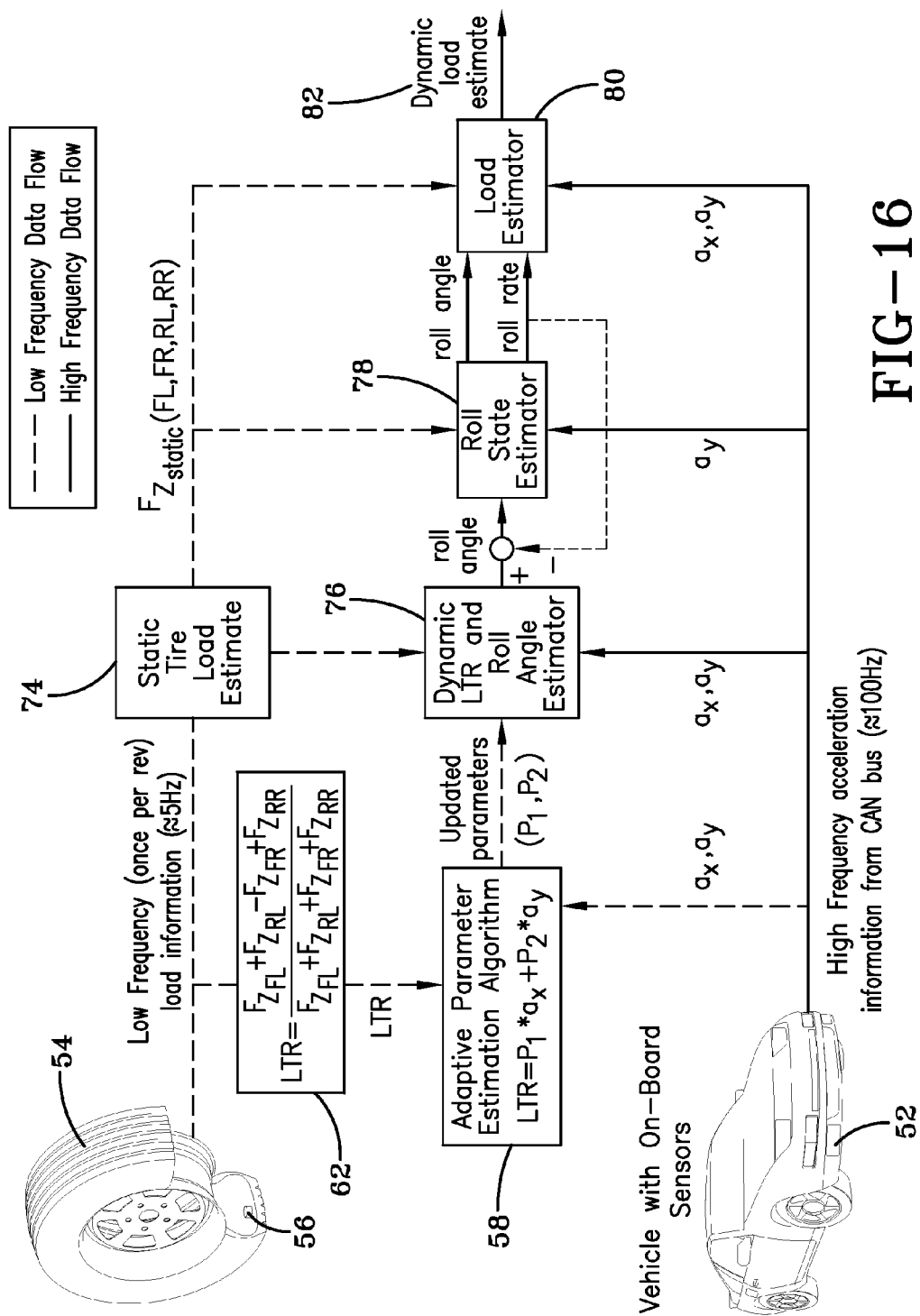
FIG. 16 is a data flow diagram of the dynamic load estimation algorithm for the Case 2 scenario.

FIGS. 15 and 16 show a dynamic load estimation system for vehicles which are not equipped to provide roll rate information by means of the CAN Bus. The system of FIGS. 15 and 16 differs from that described above in FIGS. 13 and 14 only in that the roll rate $\theta'$ must be estimated rather than be provided by the CAN Bus sensors. Accordingly, in the case 2 system 84, the roll rate is estimated by means of the Luenberger Observer 70 and the factor m from the Parameter Adaptation 66 is used by the Luenberger Observer for adjusting the roll rate estimate. Output of the roll angle from the Dynamic LTR and Roll Angle Estimator 76 is input into a Roll State Estimator 78 such as a Luenberger Observer. The roll rate and roll angle from the Roll State Estimator is then used in expression (3) in order to complete a dynamic load estimation for the Case 2 situation.

Figure 17A:
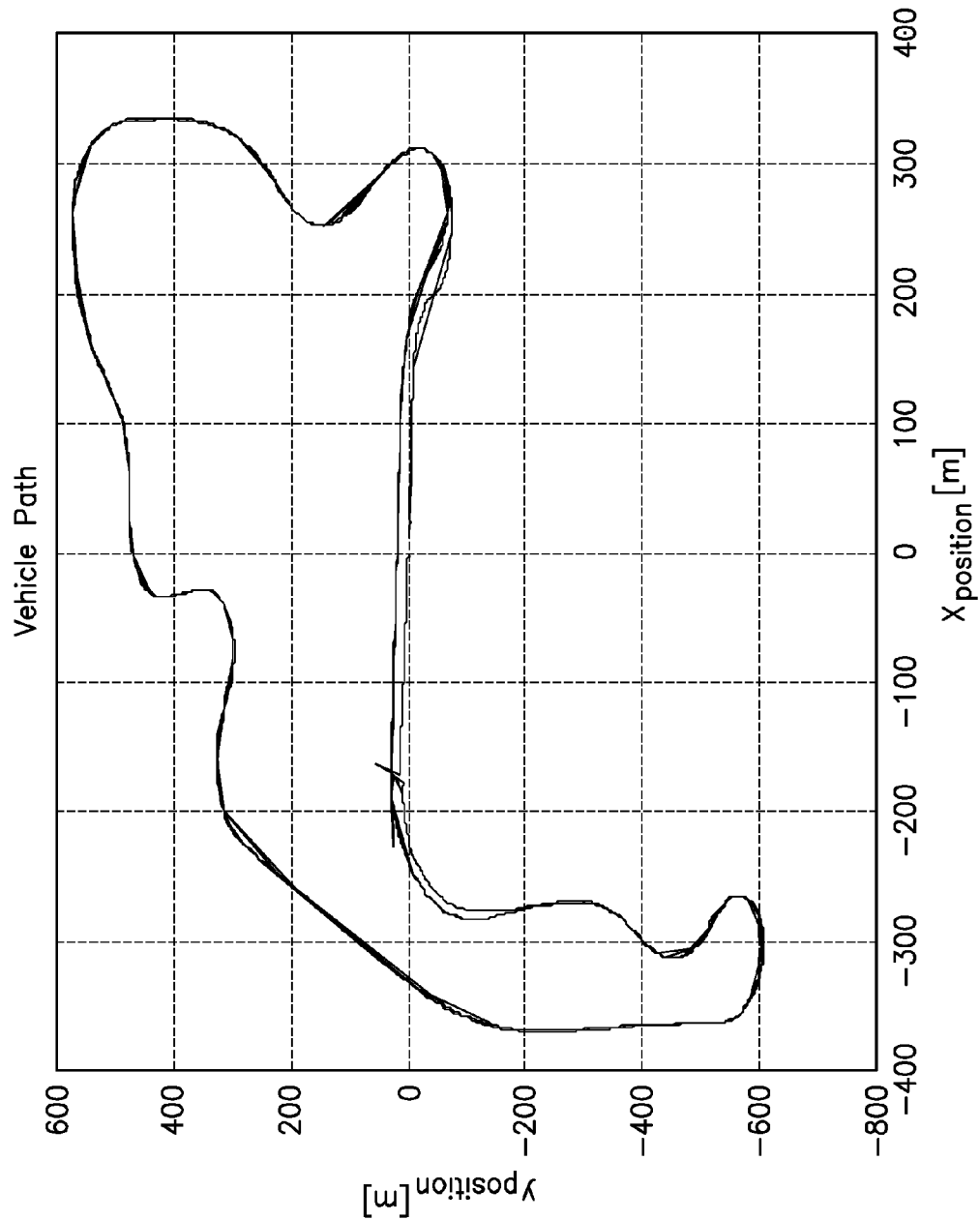
FIG. 17A is a experimental validation graph showing an experimental vehicle path in x and y coordinates.
Figure 17B:
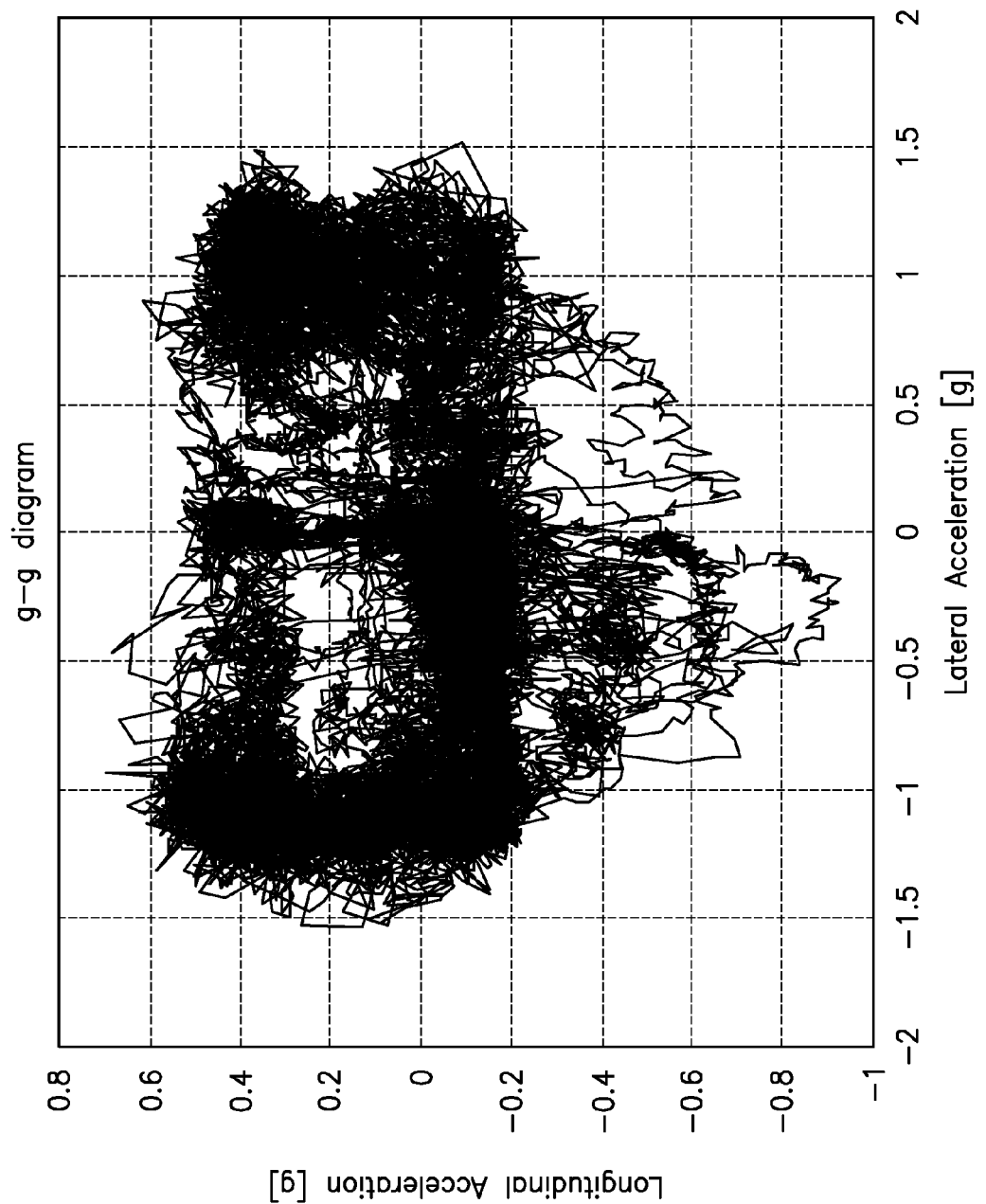
FIG. 17B is an experimental validation g-g graph showing longitudinal and lateral acceleration [g].
Figure 17C:
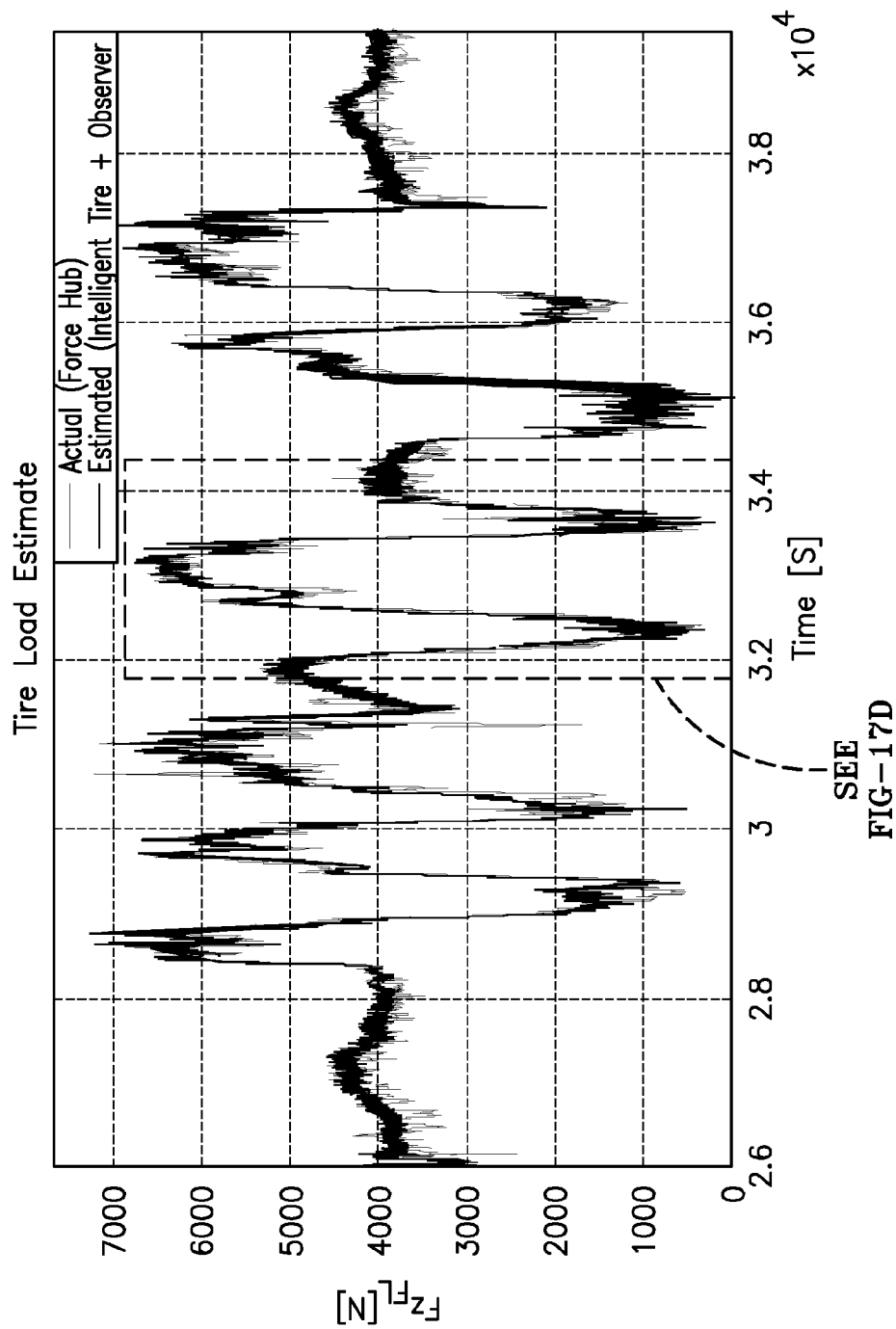
FIG. 17C is an experimental validation tire load estimate graph showing the correlation between actual load (Force Hub) and Estimated Load (Intelligent Tire and Observer).

FIGS. 17A through 17D represent Experimental Validation results for the subject dynamic load estimation system. In FIG. 17A, a vehicle path is identified in X and Y coordinate positions. FIG. 17B is a g-g diagram that graphs longitudinal acceleration and lateral acceleration [g] for the vehicle path of FIG. 17A. FIG. 17C is a Tire Load Estimation graph showing the estimated variation of tire load on the $F_{Zfl}$ tire over time and comparing actual (force hub) in fine line against the estimated load (Intelligent Tire and Observer) in heavy line. FIG. 17D represents an enlarged portion of the graph of FIG. 17C showing the close agreement between the actual loading on the tire as measured at the force hub and the estimated load made pursuant to the subject estimation system. The load estimate is empirically measured to be within approximately ten percent of the actual load.

From the foregoing, it will be appreciated that a dynamic load estimation system and method is provided for either a vehicle having a roll stability control sensor system (Case 1) or for a vehicle which does not (Case 2). The system in either case utilizes vehicle-mounted acceleration sensors for determining a vehicle lateral acceleration and a vehicle longitudinal acceleration. In vehicles equipped with a roll stability system, roll rate of the vehicle is available. Each tire in the vehicle has a load measuring sensor(s) which provides static loading data $F_{Zstatic}$. A roll angle $\theta$ is calculated using a filtering model such as a Kalman filter having as inputs the LTR (calculated from the static loading measurements); the roll rate $\theta'$, and the acceleration $a_x$, $a_y$ data (received from the CAN Bus). The estimated roll angle $\theta$, the roll rate $\theta'$, and the acceleration $a_x$, $a_y$ data (received from the CAN Bus) are then applied to a moment expression in order to calculate a dynamic loading on the vehicle.

Moreover, an adaptive load transfer ratio (ALTR) estimation model may be employed for the purpose of adapting the LTR to changes in vehicle CG. A parameter adaptation model is employed generating a parameter adaptation adjustment "m"; whereby the roll angle estimation model generates the roll angle estimation based on the LTR adjusted by the parameter adaptation adjustment "m".

The dynamic load estimation system, if the vehicle is not equipped to provide the roll rate $\theta'$, in a Case 2 embodiment, a lateral model-based roll state estimator, such as a Luenberger observer model. The lateral roll state estimator operably determines the vehicle roll angle and the vehicle roll rate from the roll angle estimation and the vehicle lateral acceleration.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A dynamic load estimation system for estimating a vehicle load comprising:
    at least one tire supporting a vehicle;
    a static load measuring sensor mounted to the one tire;
    an acceleration sensor mounted to the vehicle for determining a vehicle lateral acceleration and a vehicle longitudinal acceleration;
    a roll angle calculating means for determining a vehicle roll angle;
    a roll rate calculating means for determining a vehicle roll rate;
    a static normal load calculation means for calculating a measured static normal load from a measured input provided by the tire mounted static load measuring sensor; and
    a dynamic tire load estimation means for calculating an estimated dynamic load on the tire from the measured static normal load, the vehicle roll angle, the vehicle roll rate, the vehicle lateral acceleration and the vehicle longitudinal acceleration.

2. The dynamic load estimation system of claim 1, wherein further comprising:
    a tire sensor means for determining a measured load transfer force on the one tire;
    an adaptive load transfer ratio estimation means for determining an adaptive load transfer ratio estimation based on the vehicle lateral acceleration and the vehicle longitudinal acceleration;
    a load transfer ratio generating means for determining a load transfer ratio from the measured load transfer force and the adaptive load transfer ratio estimation;

a roll angle estimation means for generating a roll angle estimation based on the load transfer ratio.

3. The dynamic load estimation system of claim 2, wherein further comprising a parameter adaptation calculator for generating a parameter adaptation adjustment; and wherein the roll angle estimation means generates the roll angle estimation based on the load transfer ratio as adjusted by the parameter adaptation adjustment.

4. The dynamic load estimation system of claim 3, wherein further comprising:
  a roll rate sensor means for determining a measured roll rate; and
  a filter for determining the vehicle roll angle and the vehicle roll rate from the measured roll rate and the roll angle estimation.

5. The dynamic load estimation system of claim 3, wherein further comprising filter determining the vehicle roll angle and the vehicle roll rate from the roll angle estimation and the vehicle lateral acceleration.

6. The dynamic load estimation system of claim 5, wherein the filter operably determines the vehicle roll angle and the vehicle roll rate from the roll angle estimation and the vehicle lateral acceleration as adjusted by the parameter adaptation adjustment.

7. The dynamic load estimation system of claim 6, wherein the filter comprises a lateral model-based roll state estimator.

8. The dynamic load estimation system of claim 7, wherein the lateral model-based roll state estimator comprises a Luenberger Observer model.

9. A dynamic load estimation method for estimating a load on a tire supporting a vehicle, comprising:
  mounting acceleration sensor means to the vehicle for measuring a vehicle lateral acceleration and a vehicle longitudinal acceleration;
  mounting a load sensor on the tire for generating a measured static load signal;
  determining a vehicle roll angle;
  determining a vehicle roll rate;
  determining a static normal load on the tire from the measured static load signal; and
  applying the static normal load, the vehicle roll angle, the vehicle roll rate, the vehicle lateral acceleration and the vehicle longitudinal acceleration to a dynamic tire load estimation algorithm to yield a load estimation.

10. The dynamic load estimation method of claim 9, wherein further comprising:
  determining a measured load transfer force on the tire;
  determining an adaptive load transfer ratio estimation based on the vehicle lateral acceleration and the vehicle longitudinal acceleration;
  determining a load transfer ratio from the measured load transfer force and the adaptive load transfer ratio estimation;
  generating a roll angle estimation based on the load transfer ratio.

11. The dynamic load estimation method of claim 10, wherein further comprising generating a parameter adaptation adjustment; and generating from the roll angle estimation means the roll angle estimation based on the load transfer ratio as adjusted by the parameter adaptation adjustment.

12. The dynamic load estimation system of claim 3, wherein further comprising:
  determining a measured roll rate from roll sensor means mounted to the vehicle; and
  deploying filter means for determining the vehicle roll angle and the vehicle roll rate from the measured roll rate and the roll angle estimation.

13. The dynamic load estimation system of claim 12, wherein further comprising determining by the filter means the vehicle roll angle and the vehicle roll rate from the roll angle estimation and the vehicle lateral acceleration.

14. The dynamic load estimation system of claim 13, wherein further comprising determining by the filter the vehicle roll angle and the vehicle roll rate from the roll angle estimation and the vehicle longitudinal acceleration as adjusted by the parameter adaptation adjustment.

15. The dynamic load estimation system of claim 14, wherein further comprising utilizing a lateral model-based roll state estimator as the filter.

16. The dynamic load estimation system of claim 15, wherein further comprising utilizing a Luenberger Observer model as the lateral model-based roll state estimator.

* * * * *